United States Patent
Young et al.

(10) Patent No.: US 12,261,880 B2
(45) Date of Patent: Mar. 25, 2025

(54) SYSTEMS, METHODS AND MACHINE READABLE PROGRAMS FOR ISOLATION OF DATA

(71) Applicant: Interbit Data Inc., Natick, MA (US)

(72) Inventors: Arthur Young, Natick, MA (US); Brian Main, Natick, MA (US)

(73) Assignee: Interbit Data Inc., Natick, MA (US)

( * ) Notice: Subject to any disclaimer, the term of this patent is extended or adjusted under 35 U.S.C. 154(b) by 0 days.

(21) Appl. No.: 17/508,504

(22) Filed: Oct. 22, 2021

(65) Prior Publication Data

US 2022/0046056 A1 Feb. 10, 2022

Related U.S. Application Data

(63) Continuation of application No. 16/785,180, filed on Feb. 7, 2020, now abandoned.

(60) Provisional application No. 62/802,769, filed on Feb. 8, 2019.

(51) Int. Cl.
| | |
|---|---|
| *G06F 21/60* | (2013.01) |
| *G06F 16/11* | (2019.01) |
| *H04L 9/40* | (2022.01) |

(52) U.S. Cl.
CPC ........ *H04L 63/1466* (2013.01); *G06F 16/116* (2019.01); *G06F 21/602* (2013.01); *G06F 21/604* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 2005/0144042 A1* | 6/2005 | Joffe | ...................... | G16H 10/60 705/2 |
| 2007/0106751 A1* | 5/2007 | Moore | ................... | G16H 10/60 709/217 |
| 2008/0151284 A1* | 6/2008 | Morales | ................ | G06F 3/1285 358/1.15 |
| 2011/0153351 A1* | 6/2011 | Vesper | ................... | G16H 30/20 705/2 |
| 2013/0054467 A1* | 2/2013 | Dala | ................... | G06F 21/6245 705/51 |

(Continued)

FOREIGN PATENT DOCUMENTS

| | | |
|---|---|---|
| CN | 107239240 A * | 10/2017 |
| JP | 2011524564 A * | 5/2009 |

*Primary Examiner* — Sakinah White Taylor
(74) *Attorney, Agent, or Firm* — DeWitt LLP; Brian R. Pollack, Esq.

(57) ABSTRACT

The disclosure provides systems, methods and machine readable programs for isolation of data. In some implementations, this is performed on a healthcare information system (HCIS). It will be noted, however, that the disclosed embodiments can be used for different fields of endeavor, and for data other than medical patient data. After capturing data elements, such as patient records, the system automatically reviews and can extract the data elements in an isolated location, generates and stores reports, encrypts the reports, and sends them to multiple designated workstations and devices throughout a network at regular intervals to ensure that the most recent patient data is captured. After a compromising event, such as a system outage or a cyberattack, the updated patent data can be accessed locally by way of a locally installed client program.

9 Claims, 25 Drawing Sheets

(56) References Cited

U.S. PATENT DOCUMENTS

| | | | |
|---|---|---|---|
| 2013/0218597 A1* | 8/2013 | Lorsch | G16H 10/60 705/3 |
| 2014/0081663 A1* | 3/2014 | Calandro, II | G16H 10/60 705/3 |
| 2014/0304505 A1* | 10/2014 | Dawson | G06F 21/6227 713/165 |
| 2016/0124920 A1* | 5/2016 | Golay | G06F 40/143 705/3 |
| 2017/0237747 A1* | 8/2017 | Quinn | G06F 21/602 726/29 |

* cited by examiner

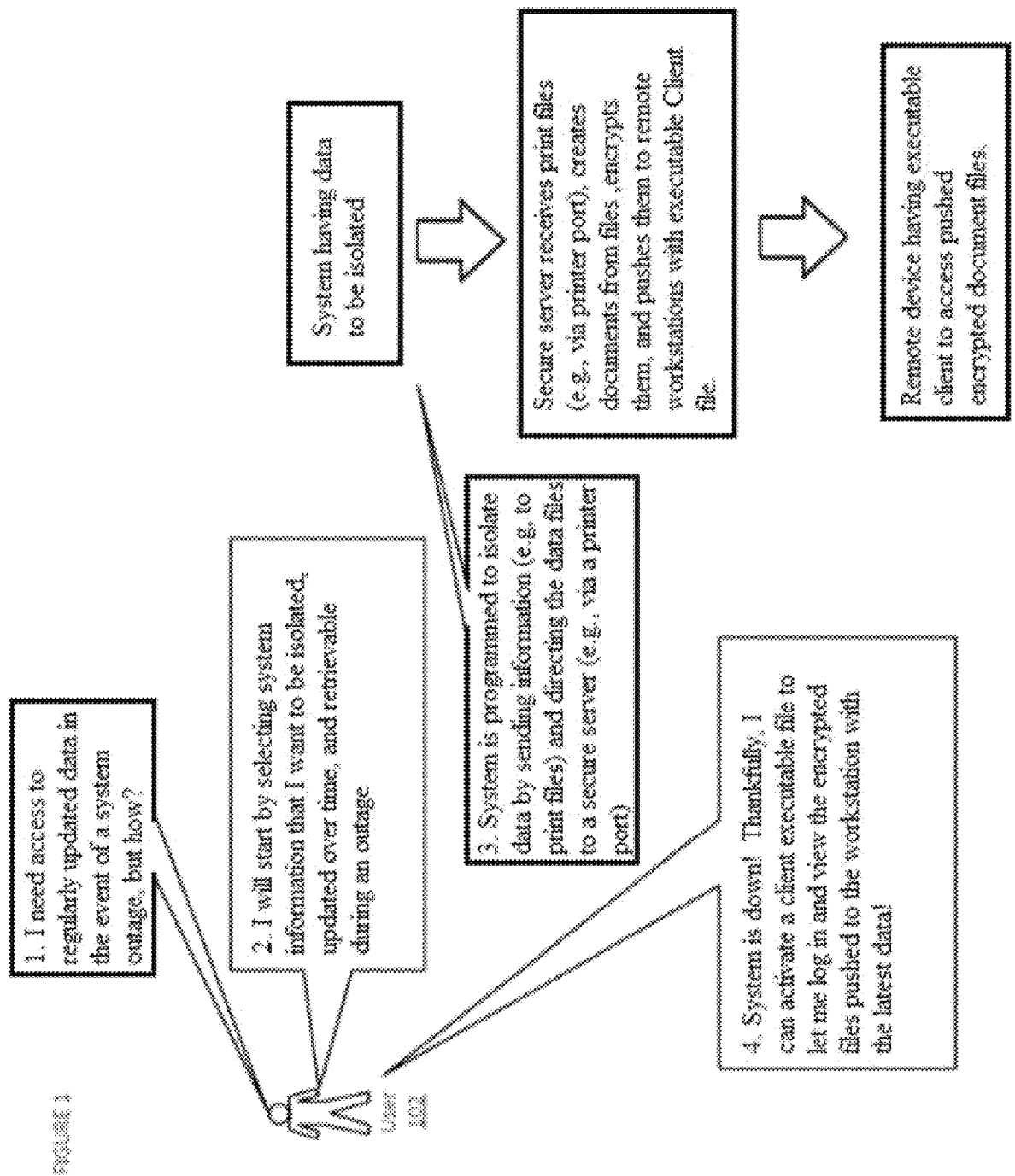

FIGURE 4B

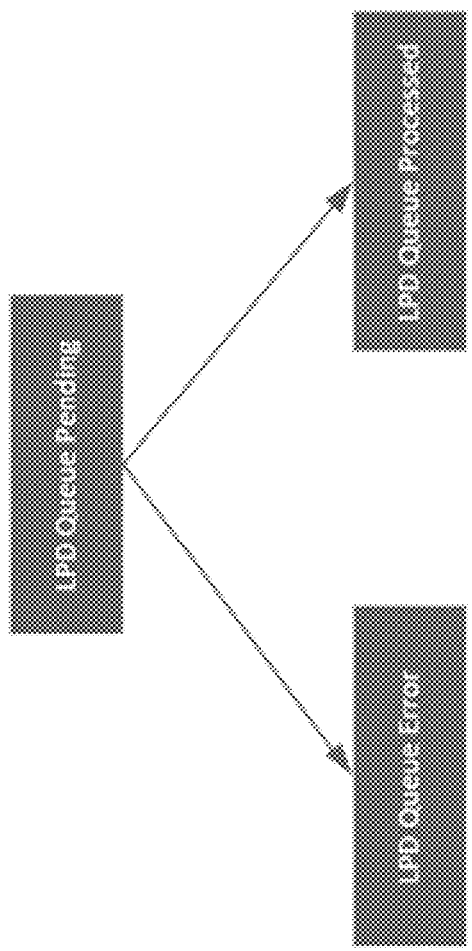
FIGURE 6-D ed by the methods and systems particularly pointed out in the written description and claims hereof, as well as from the appended drawings.
SYSTEMS, METHODS AND MACHINE READABLE PROGRAMS FOR ISOLATION OF DATA

CROSS-REFERENCE TO RELATED APPLICATIONS

The present patent application is a continuation of and claims the benefit of priority to U.S. patent application Ser. No. 16/785,180, mailed Feb. 7, 2020, which in turn claims the benefit of priority to U.S. Provisional Patent Application No. 62/802,769, filed Feb. 8, 2019. The aforementioned patent application is hereby incorporated by reference in its entirety for any purpose whatsoever.

COPYRIGHT NOTICE

A portion of the disclosure of this patent document (including Appendices) contains material which is subject to copyright protection. The copyright owner has no objection to the reproduction by anyone of the patent document or patent disclosure as it appears in the Patent and Trademark Office, patent file or records, but otherwise reserves all copyrights whatsoever.

BACKGROUND

During a ransomware attack, a user loses access to their computer system. This can have grave consequences in various settings, such as hospitals and clinics. The present disclosure provides solutions for these and other problems, as set forth herein.

SUMMARY OF THE DISCLOSURE

The purpose and advantages of embodiments of the present disclosure will be set forth in and become apparent from the description that follows. Additional advantages of embodiments of the present disclosure will be realized and attained by the methods and systems particularly pointed out in the written description and claims hereof, as well as from the appended drawings.

To achieve these and other advantages and in accordance with the purpose of the disclosure, as embodied herein, in accordance with some aspects, the disclosure provides methods, and related devices and machine readable programs that allow a user to capture or generate reports using data located on a computer system. In some implementations, including those illustrated herein, this is illustrated as being performed on a healthcare information system (HCIS). It will be noted, however, that the disclosed embodiments can be used for different fields of endeavor, and for data other than medical patient data. After capturing data elements, such as patient records, the system automatically reviews and can extract the data elements in an isolated location, generates and stores encrypted reports, for example, at multiple local designated workstations and devices throughout a network at regular intervals to ensure that the most recent patient data is captured. Having up-to-date patient information available whenever clinicians and admissions need it ensures they can deliver quality patient care, maintain high patient satisfaction and avoid costly or life threatening mistakes even when their systems or networks are unavailable, such as in the event of a compromising event, such as a system outage or cyberattack. By ensuring clinicians have access to critical data during periods of system failure or extended downtime, healthcare organizations mitigate risks to patient care and safety.

In accordance with one embodiment, a method of isolating data to protect the data from a compromising event, such as a cyberattack, is provided that permits access to the data after the compromising event initiates. The method includes identifying data to be isolated on a first computer system via processor, the first computer system being vulnerable to a compromising event. The method further includes selecting the data to be isolated on the first computer system, forwarding the data to a second computer system via processor to isolate the data from the first computer system, analyzing the data on the second computer system via processor, and transforming the data into a document file.

In accordance with some embodiments, the method can further include writing the selected data to a data file via a processor on the first computer system. The method can further include reading the data from the data file on the second computer system via processor prior to the analyzing step. The data can be selected on the first computer system in accordance with a plurality of predefined rules. In certain embodiments, the data file includes no executable code. In certain embodiments, the data file is a text file. If desired, the data file can be a database file. The text file includes ASCII characters. In some implementations, writing the data to the data file can include sending the data to a printer port. The data file can be a print file, such as a PCL file or a post script file.

In accordance with particular embodiments, the data to be transferred typically includes patient data. But, the data to be transferred can additionally or alternatively include financial data, message data, personal data, form data and image data.

In some embodiments, the analyzing step can include analyzing characters in the data file for patient information. If desired, transforming the data into the document file can include encrypting the data in the document file.

In further embodiments, the method can include storing the document file and/or delivering the document file to a third computer system. If desired, analyzing the data while on the second computer system can include determining at least one location for delivering a document file based on at least one user-defined rule. The document file can be delivered to the at least one location automatically. If desired, the document file can be delivered to a plurality of disparate locations that may be disparate locations. If desired, the method can include permitting a user to monitor and correct delivery errors through report queues. In some embodiments, the third computer system can be physically located remotely with respect to the first computer system and the second computer system.

In some implementations, the method can further include purging data older than a predetermined age, and/or data based on location of the data.

In some embodiments, the method can further include analyzing the forwarded data file on the second computer system via processor to determine if the data file includes any computer viruses therein or attached thereto prior to reviewing data in the data file.

The disclosure further provides methods of retrieving medical patient data after a compromising event, such as a cyberattack or other system outage. Some embodiments of the method include providing a non-transitory machine readable medium storing instructions executable by a processor which, when executed by the processor, cause the processor to provide an authentication interface to permit a user to be granted access to at least one encrypted document file that is also stored on the non-transitory machine readable medium, said at least one encrypted document including patient data for at least one patient.

In some embodiments, the method can further include authenticating and unencrypting said at least one encrypted document on a local machine. The method can still further include providing instructions to the user in order to access the at least one encrypted document file. The instruction to access the at least one encrypted document file can be located on and accessed from a server. The instruction to access the at least one encrypted document file can be located on and accessed from a web-enabled server. If desired, the instruction to access the at least one encrypted document file can be located on and accessed from the non-transitory machine readable medium. The authentication interface can be provided by executable code stored on the non-transitory machine readable medium. In some embodiments, executable code stored on the non-transitory machine readable medium can be configured to seek an active directory on a server in order to authenticate the user. If desired, the executable code can be configured to generate and store audit trail data in an encrypted audit trail data file indicating when data was accessed from the non-transitory machine readable medium and who accessed the data from the non-transitory machine readable medium. The audit trail data file can be set to an active directory path and is configured to query said active directory path by default.

The disclosure also provides embodiments of a method of providing updated data to clinicians in a hospital or clinic after a compromising event, such as a cyberattack has compromised a computer system of the hospital clinic. Certain embodiments of the method include generating patient data reports that include patient data obtained from a healthcare information system (HCIS) of the hospital or clinic prior to the compromising event, encrypting the patient reports, storing the encrypted reports on a secure server in a manner that permits their retrieval after the network of the hospital or clinic becomes disabled due to the compromising event, and repeating the aforementioned steps at regular intervals to ensure that recent patient data is captured to permit said recent patient data to be accessed by clinicians after the compromising event.

The disclosure further provides various embodiments of a non-transitory machine readable medium storing instructions executable by a processor which, when executed by the processor, cause the processor to carry out any of the functions set forth herein. The disclosure also provides various embodiments of systems for carrying out the functions set forth herein.

It is to be understood that both the foregoing general description and the following detailed description are exemplary and are intended to provide further explanation of the claimed embodiments.

The accompanying drawings, which are incorporated in and constitute part of this specification, are included to illustrate and provide a further understanding of the methods and systems of the disclosure. Together with the description, the drawings serve to explain the principles of embodiments of the present disclosure.

BRIEF DESCRIPTION OF THE DRAWINGS

FIG. 1 is a schematic diagram in accordance with the present disclosure.

FIGS. 2A-8A illustrate user interfaces for programming and configuring embodiments in accordance with the present disclosure, or related process flows.

DETAILED DESCRIPTION OF THE PREFERRED EMBODIMENTS

Figure 2A:
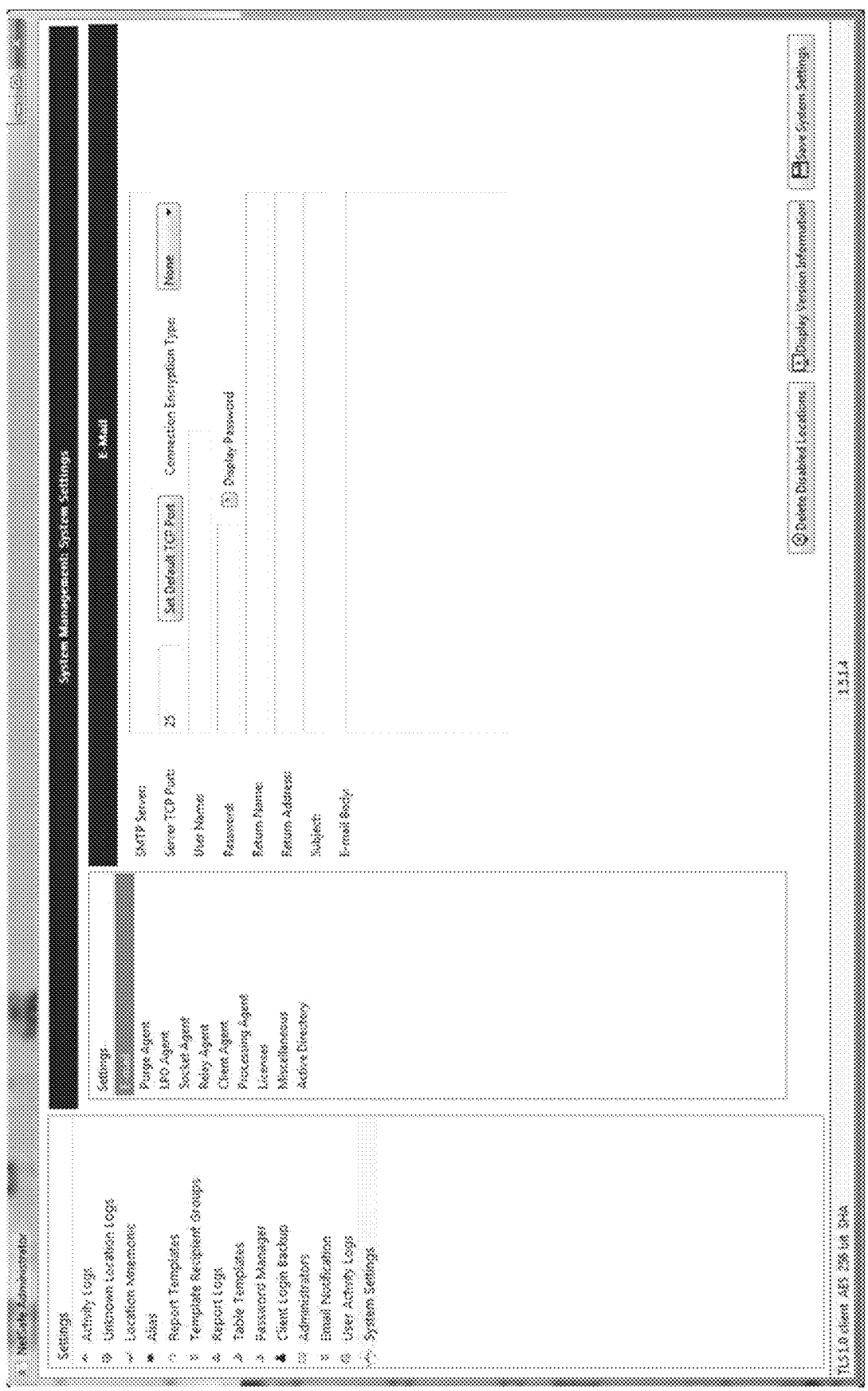

Reference will now be made in detail to the present preferred embodiments of the disclosure, examples of which are illustrated in the accompanying drawings. The methods and corresponding steps of the disclosure will be described in conjunction with the detailed description of the system.

The devices, machine readable programs and methods presented herein may be used for myriad purposes. In particular illustrated embodiments, they may be used for management of patient medical data. But, they may additionally or alternatively used for other types of sensitive data, including financial data, or other personal or private data, business processes, technical information, manufacturing specifications, identification information, government information, military information, law enforcement data, and the like. Additional illustrative, non-limiting examples of the disclosed embodiments are provided in the Appendix appended to U.S. Provisional Patent Application No. 62/802,769, filed Feb. 8, 2019, which is incorporated by reference herein in its entirety for any purpose whatsoever.

In the medical field, network and system downtime, whether unplanned or scheduled, can create a potential risk of reduced patient care. When the electronic patient information is unavailable due to network or system outages, an organization's ability to care for the patients can be compromised. Being able to continually retrieve and review patient information and reports can be critical, if the host system is available or unreachable for any reason. Embodiments in accordance with the present disclosure allow for decentralized backup of patient information. Unlike a centralized approach, in accordance with various embodiments herein, a user can capture reports generated by a HCIS, for example, automatically extract data elements from the reports, and store the reports at locations throughout a network at regular intervals.

Some of the disclosed embodiments are configured so that the most recent patient data is captured. Thus, if a user's network or system becomes unavailable, those individuals who need immediate access to timely information can search the locally stored reports for patient information, and view or print it as needed.

Thus, embodiments are provided that can in turn provide business continuance, for example, after a compromising event such as a cyberattack or other system outage or system maintenance. In some embodiments, two applications are provided. A first administrator server application can be used for isolating important data on a vulnerable computer system for being accessed after a disruption by moving the isolated data to a secured server, and a client application can be provided for a user to access the isolated data on the secured server after the disruption. A variety of different types of reports can be prepared and sent to the secured server. It is also possible to separate, process, and deliver to specific workstations located throughout an organization, such as a hospital.

In some embodiments, a system is provided that can receive reports, separate reports by patient, converts reports to a portable document (e.g., .PDF) format, encrypt the reports, and distributes reports to workstations throughout a facility (e.g., hospital). These distributed reports are available during system down time. The system can receive many different types of reports, such as a EMAR (Electronic Medication Administration Record), a MAR (Medication Administration Record), a LAB Summary Report, a MPI (Master Patient Index), a Nursing Rounds Report, a Physician Rounds Report, a KARDEX report, a Patient Profile report, a Surgical Case List report, an Alpha Census report, a Location Census report, a Dietary Report, and batch reports.

For purposes of illustration, and not limitation, as illustrate in FIG. 1, a user 102 is faced with a dilemma of how to access the most recent data if a compromising event, such as a system outage, cyberattack or other even renders their network unavailable. In accordance with the disclosure, the user 102 accesses a system in accordance with the disclosure and selects data to be isolated, protected, and periodically updated. The system is programmed to isolate data, for example, to a print file and send that print file to a printer port of the system, such as a HCIS system. A secure server that is isolated from the main system listens on the printer port for new print files and loads them as they are made available. Based on criteria selected by the user 102, the secure server reads the print files and extracts all or some of the data and creating a document from that data. As such, the data has been isolated from the main system and effectively stored in a vault in the secure server. To facilitate access to that isolated data, the documents are encrypted and pushed to one or more user selected locations, which can be on the original system or network from which the data was originally obtained. These encrypted document files can be accessed locally by way of an executable Client that verifies the user can have access to the encrypted files, and provides access to the files for review and/or for printing on paper or forwarding to a further device. Alternatively, a user can log into the secure server, if it is available by a web application, or by a direct network connection, to access the documents as stored on the secured server.

In some implementations, certain reports can print as a single file for an individual patient, while others can print as a batch-file, which contains multiple patients. The system can be configured to determine if such batch-reports are separated by patient or location. If a report is separated by patient, each patient can have a separate report that can be delivered to the workstation that is in the unit housing the patient. If a report is separated by location, each location can have a separate file that only contains patients for that location. Those reports can then be delivered to the workstations that are mapped to those locations. Reports, for example, for an ICU (Intensive Care Unit) location can be delivered to the workstation in the ICU. Reports for a physical location in a facility (e.g., "2West") can be delivered to a workstation in that location.

In some implementations, certain reports may not need to be separated. This can be due to a variety of reasons. For example, it may not be possible or practicable to separate the report by patient or location. An example of a report that cannot be separated by patient or location is a patient census listing all patients present in the facility, or admitted during a particular time window. Moreover, in some instances, a report may be better presented as a whole document without being broken out by patient or location. An example of this may be the LAB Summary, which is delivered to a downtime workstation in the LAB. If desired, the system can be configured to separate one or more reports at the middle or end of a page. One or more user-selected criteria can be used by the system to separate reports, such as a patient's name, patient's account number, location, and the like. Or, certain key words or criteria can be used for separating reports, such as END OF REPORT. Various embodiments are configured so as to not remove or add information to a report. If desired, a given system can be configured to separate or not separate a specific report based on specified criteria. Separated reports can be delivered to certain workstations while unseparated versions of the same report can be delivered to other workstations. For example, a MAR report can be separated by patient and be delivered to workstations at a first set of locations. A non-separated MAR report can be delivered to a workstation in a second location, such as a hospital pharmacy.

Email Notifications

It is preferred that systems in accordance with the present disclosure are able to continuously process reports without interruption. This helps ensure that if system downtime does occur, workstations throughout the hospital will have the most up-to-date information available for their staff. In some implementations, this can be facilitated by setting up Email Notifications that inform an administrator know if a report was not able to process through the system correctly.

Figure 2B:
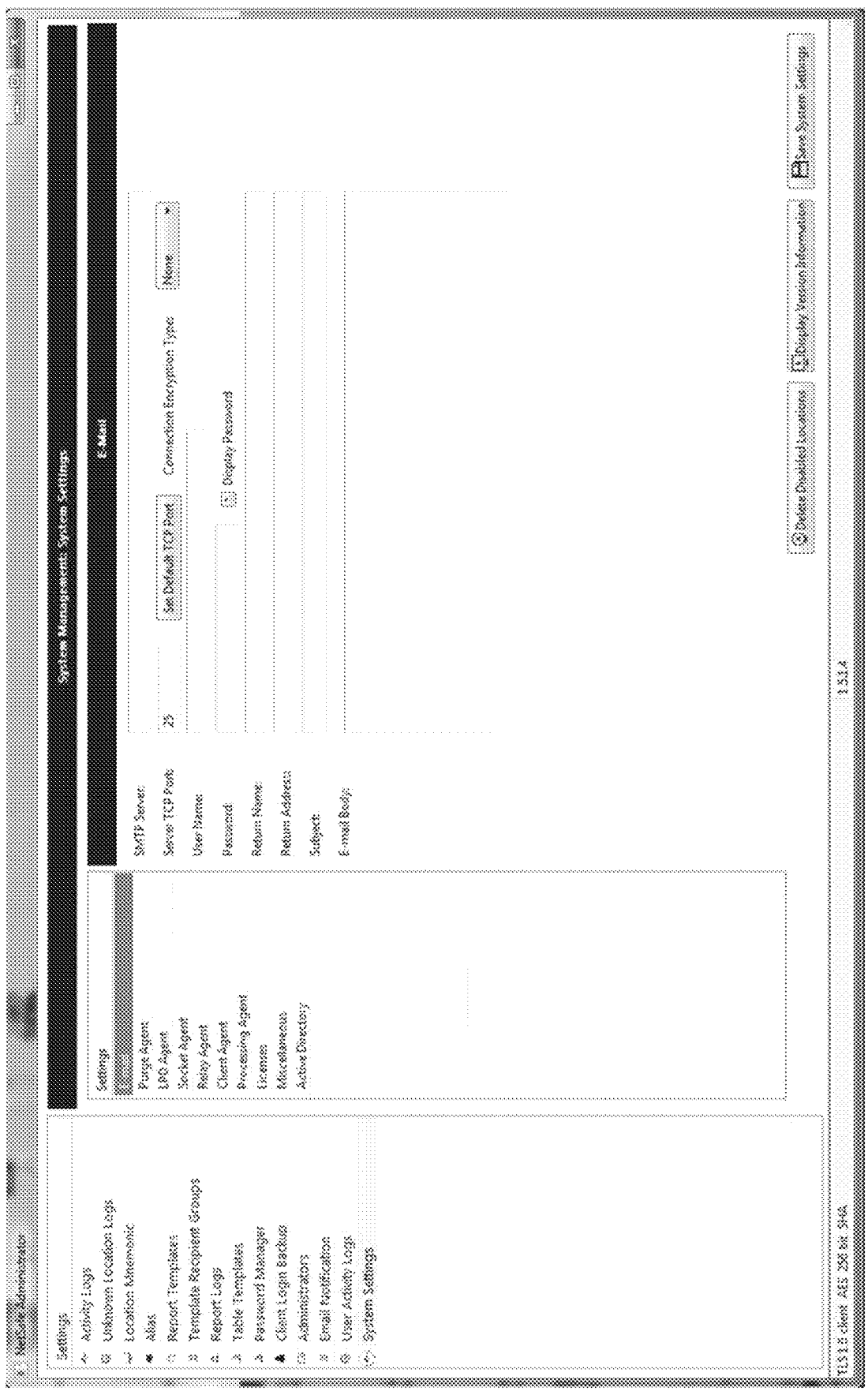
Figure 2C:
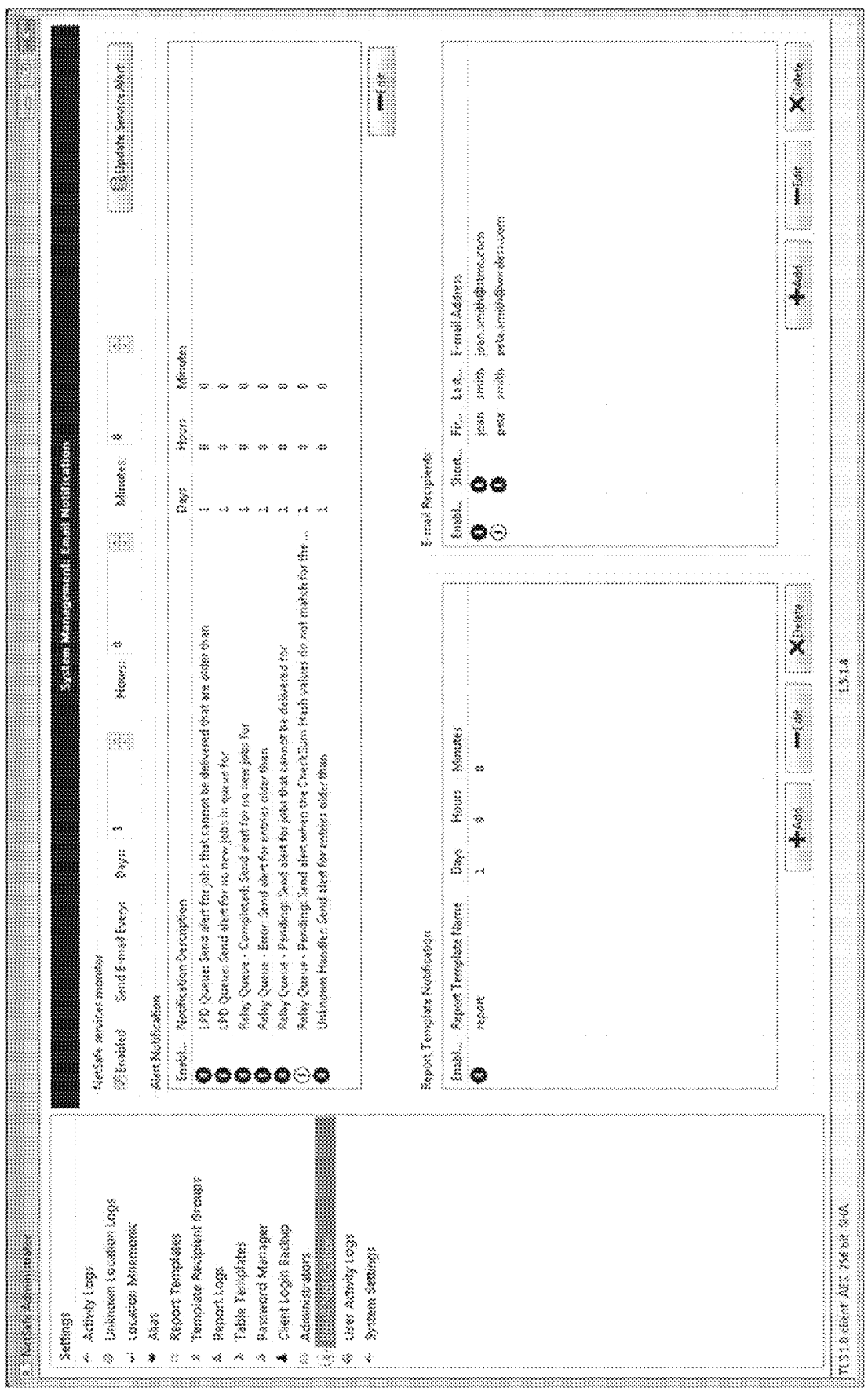

In some embodiments, to set up email notifications, a connection to a facility's (e.g., hospital's) (SMTP) Simple Mail Transfer Protocol server can be configured. As an illustrative embodiment, the interface in FIG. 2A thereby permits one to configure email notifications by way of connection to a facility's (SMTP) Simple Mail Transfer Protocol server. As illustrated in FIG. 2B this can be done under a system settings menu, e-mail submenu. Table 1 below illustrates the various fields in the GUI and the associated description for each of those fields:

TABLE 1

| Field | Description |
| --- | --- |
| SMTP Server | The name of the server from which e-mails are sent. |
| Server TCP port | The port used for e-mail. |
| Set Default TCP Port | Resets the Server TCP Port. |
| Connection Encryption Type | Displays the encryption methodology. |
| User Names | The name of the account used for sending e-mail. |
| Password | The password of the account used for sending e-mail (should be greater than four characters). |
| Display Password | The method for displaying the password on this menu; toggle between the stored alphanumeric characters and *. |
| Return Name | The name that displays in the From: field of all e-mails sent by System |
| Return Address | The e-mail address of the account used to send e-mails from System. This address displays in the From: field of all e-mails sent by System. |
| Subject | System does not use this field. |
| E-mail Body | System does not use this field. |

After establishing the SMTP settings, the next step is to enable different email alerts. Enabling different email alerts can be done under the email notifications menu in the settings list. The Email Notification Dialog lists all the alert notifications that can be set up. The different alerts illustrated below relate to different queues, which in turn correspond to different stages that a report is in while it is processing through the system.

TABLE 2

Email Notification Alerts Queue

| Queue | Description |
|---|---|
| LPD Queue-Pending | LPD Queue: Send Alert for jobs that cannot be delivered that are older than n day, n hour, n minute |
| LPD Queue-Pending | LPD Queue: Send Alert for no new jobs in queue n day, n hour, n minute |
| Relay Queue-Completed | Relay Queue-Completed: Send Alert for no new jobs for n day, n hour, n minute |
| Relay Queue-Error | Relay Queue-Error: Send Alert for entries older than n day, n hour, n minute |
| Relay Queue-Pending | Relay Queue - Pending: Send Alert for jobs that cannot be delivered for n day, n hour, n minute |
| Relay Queue-Pending | Only the email frequency is used in this alert as the days, hours, and minutes have no effect on this email alert |
| Unknown Location | Unknown Handler: Send Alert for entries older than n day, n hour, n minute |

If desired, a user can set up alerts such that the user can receive a notification soon after a problem arises. The timing of the alerts can be set up in accordance with an expected timing scheduling of the delivery of reports. For example, if a report is expected to come in to the LPD Queue every hour, the initial alert may be set to one hour and fifteen-minutes. In this example, there is a fifteen-minute window for the LPD issue to get addressed before an alert is triggered. The same user may alternatively choose to set the delay to two-hours, so the user is not getting inundated with alert reminders while they work on fixing the original LPD issue. Further details on email notifications can be found in the Appendix appended to U.S. Provisional Patent Application No. 62/802,769, filed Feb. 8, 2019, which is incorporated by reference herein in its entirety for any purpose whatsoever.

Distribution Group Configuration

Distribution Groups are used in cases where a report needs to be sent to multiple locations. This feature is illustrated with the use of two non-limiting examples. In a first example, an Intensive Care Unit (ICU) has multiple workstations that need to receive a copy of a report. A user of the system can set up an ICU Distribution Group that encompasses all the workstations within that unit that should be receiving reports. In accordance with another example, an Alpha Census of patients in a hospital facility might need to be sent to multiple units. In this example, a user of the system can set up a Distribution Group that includes the work stations that the Alpha Census needs to be sent to.

Figure 3A:
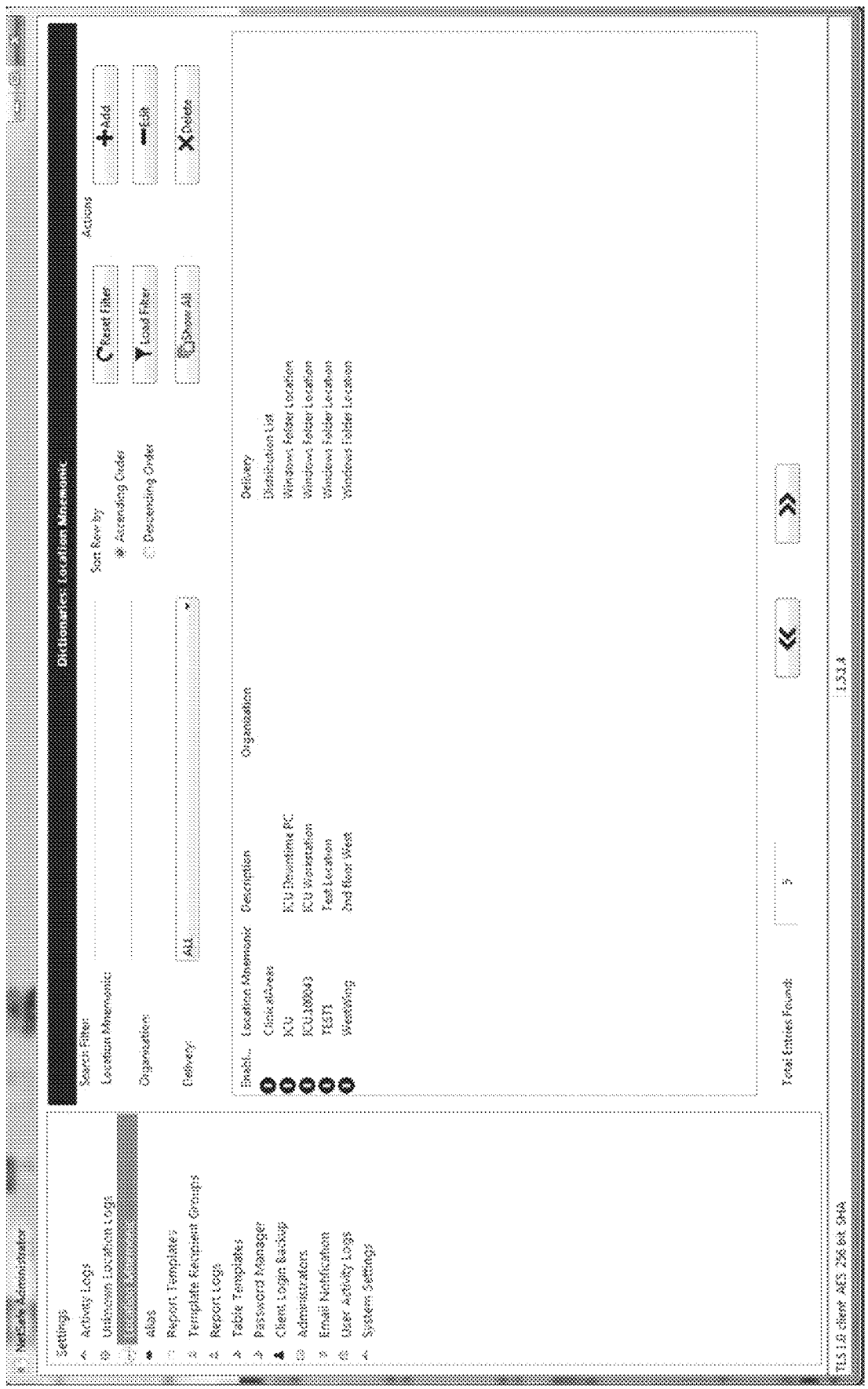
Figure 3B:
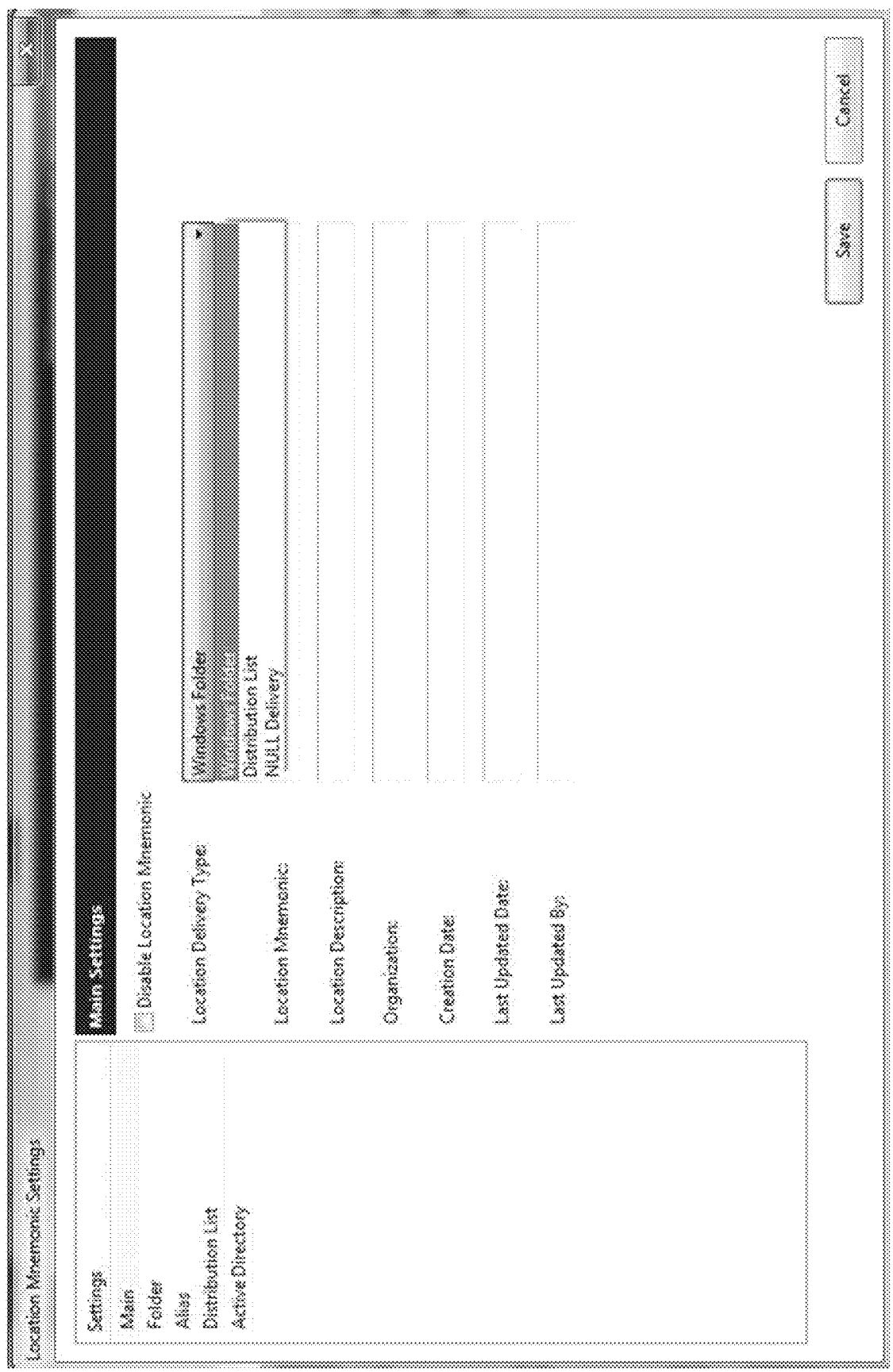

In some embodiments, a distribution groups can be built under the Location Mnemonic menu illustrated in FIG. 3A to create a distribution group, a user navigates to the location mnemonic menu and clicks on the Add button. The below Table 3 illustrates the function relating to each of the fields presented in the GUI in FIG. 3B:

TABLE 3

| Element | Description |
|---|---|
| Disable Location Mnemonic | Indicates whether the location mnemonic is enabled or disabled. |
| Location Delivery Type | Specifies the type of location mnemonic being defined. |
| Location Mnemonic | The unique name that identifies the location mnemonic within system. |
| Location Description | A short statement or explanation about the role of this location mnemonic. |

TABLE 3-continued

| Element | Description |
|---|---|
| Organization | The name of the organization/department to which the location mnemonic distributes the reports. |
| Creation Date | Displays the date and time that the location mnemonic was created. |
| Last Updated Date | Displays the date and time that the location mnemonic was last updated |
| Last Updated By | Displays the name of the system Administrator account that was last used to update the location mnemonic. |

Figure 3C:
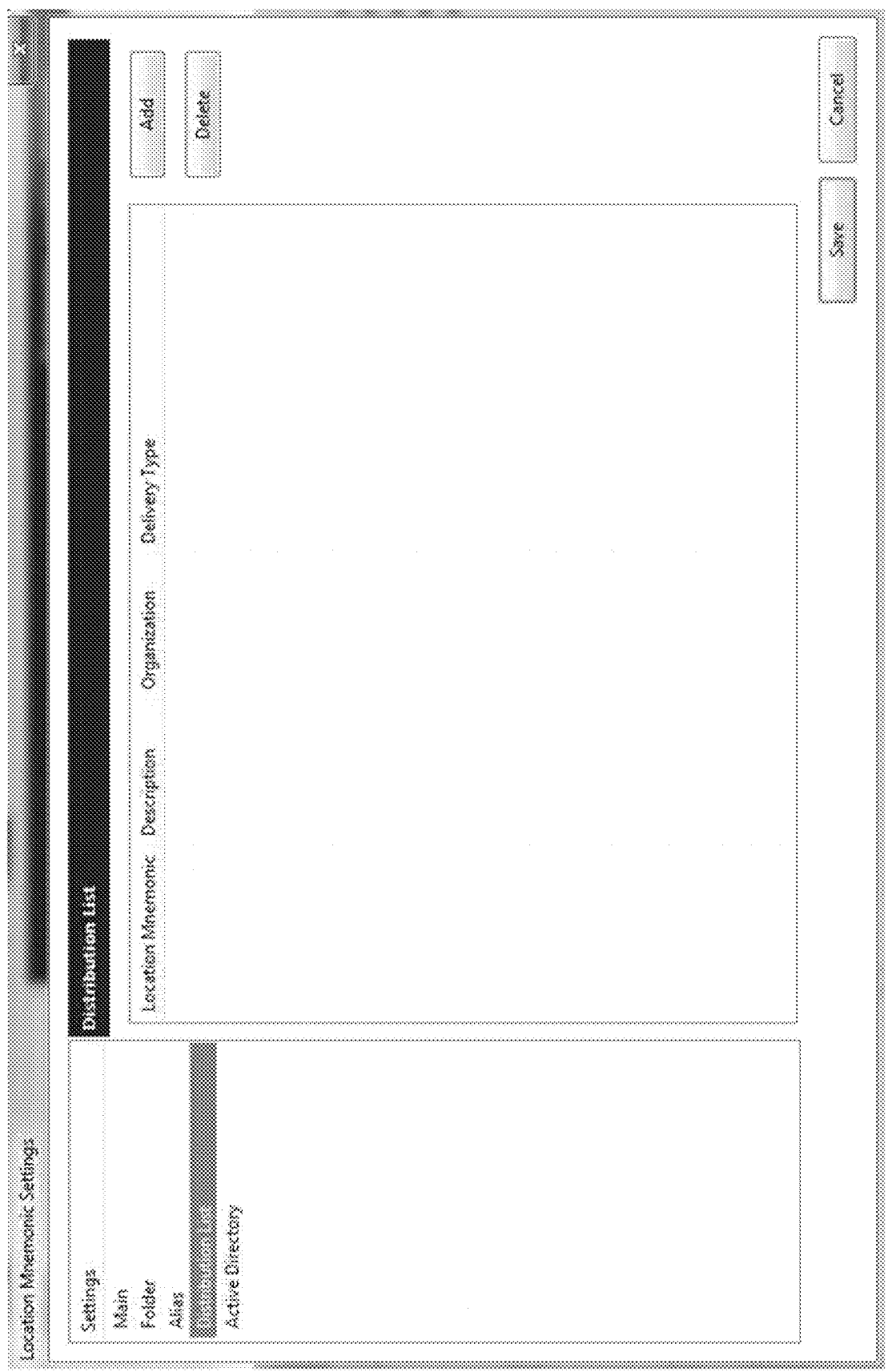
Figure 3D:
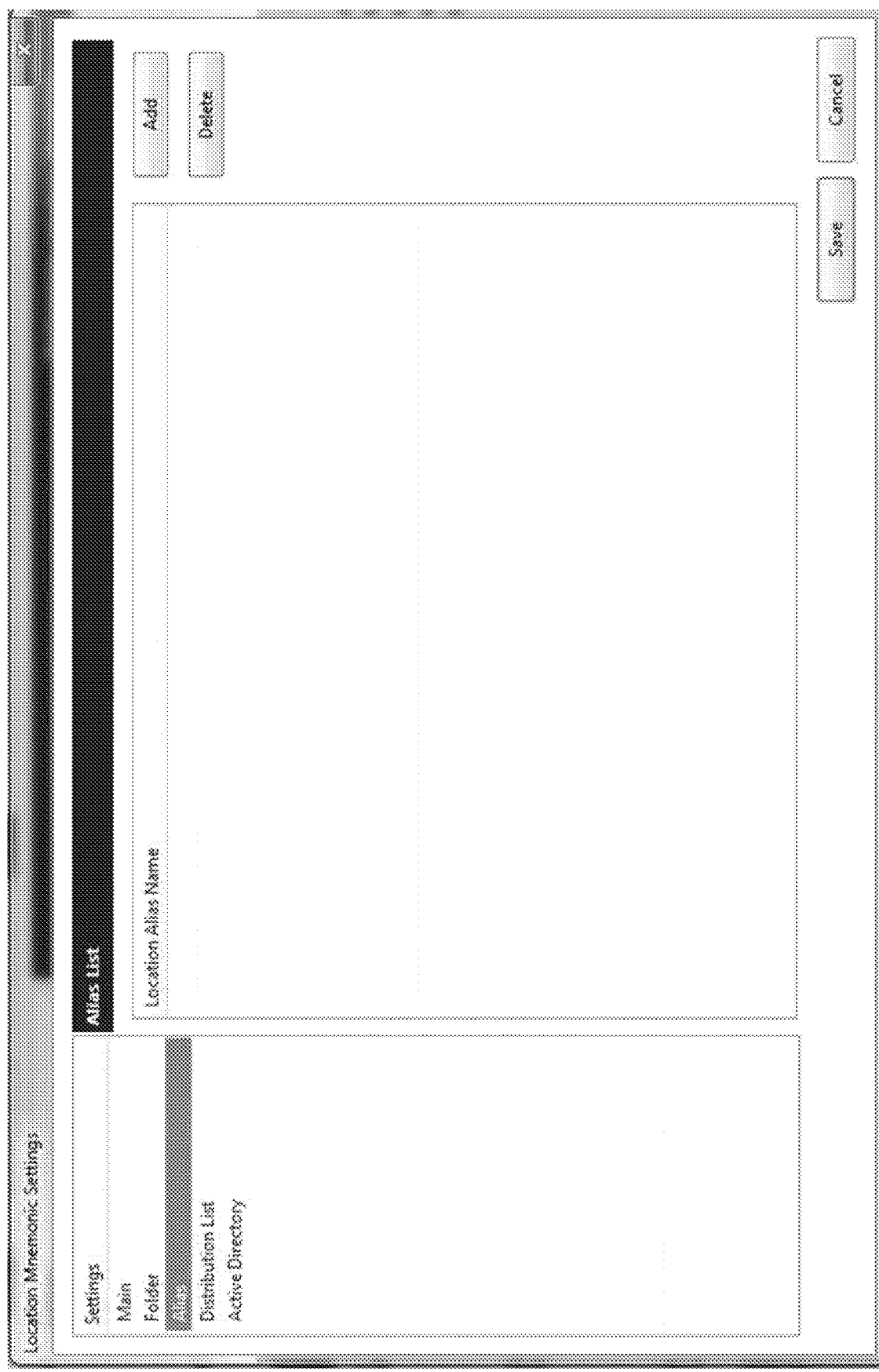

Next, a user can navigate to the distribution list menu as illustrated in FIG. 3C. The user can click the Add button to add folder locations to the distribution list. These are the folder locations that the distribution list will forward reports to. If this distribution list represents a unit location, for instance, ICU, ED, 2West, etc. that includes multiple PC workstations, then the distribution list will need to have an alias assigned to it. With reference to FIG. 3D, in order to accomplish this, the user navigates the cursor to the Alias menu, clicks the Add button, and assigns and enters the relevant information. A location can have multiple aliases.

Figure 3E:
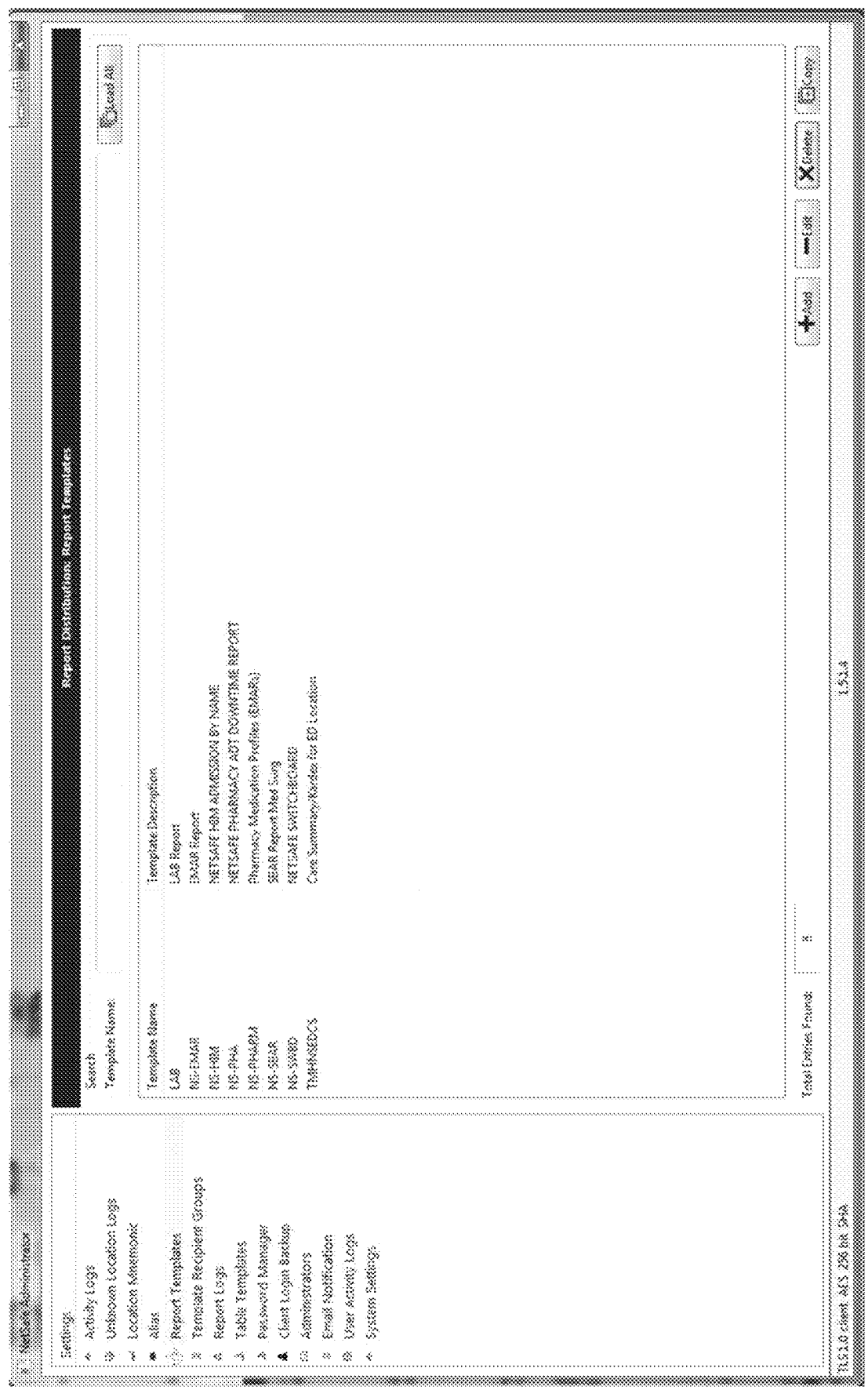
Figure 3F:
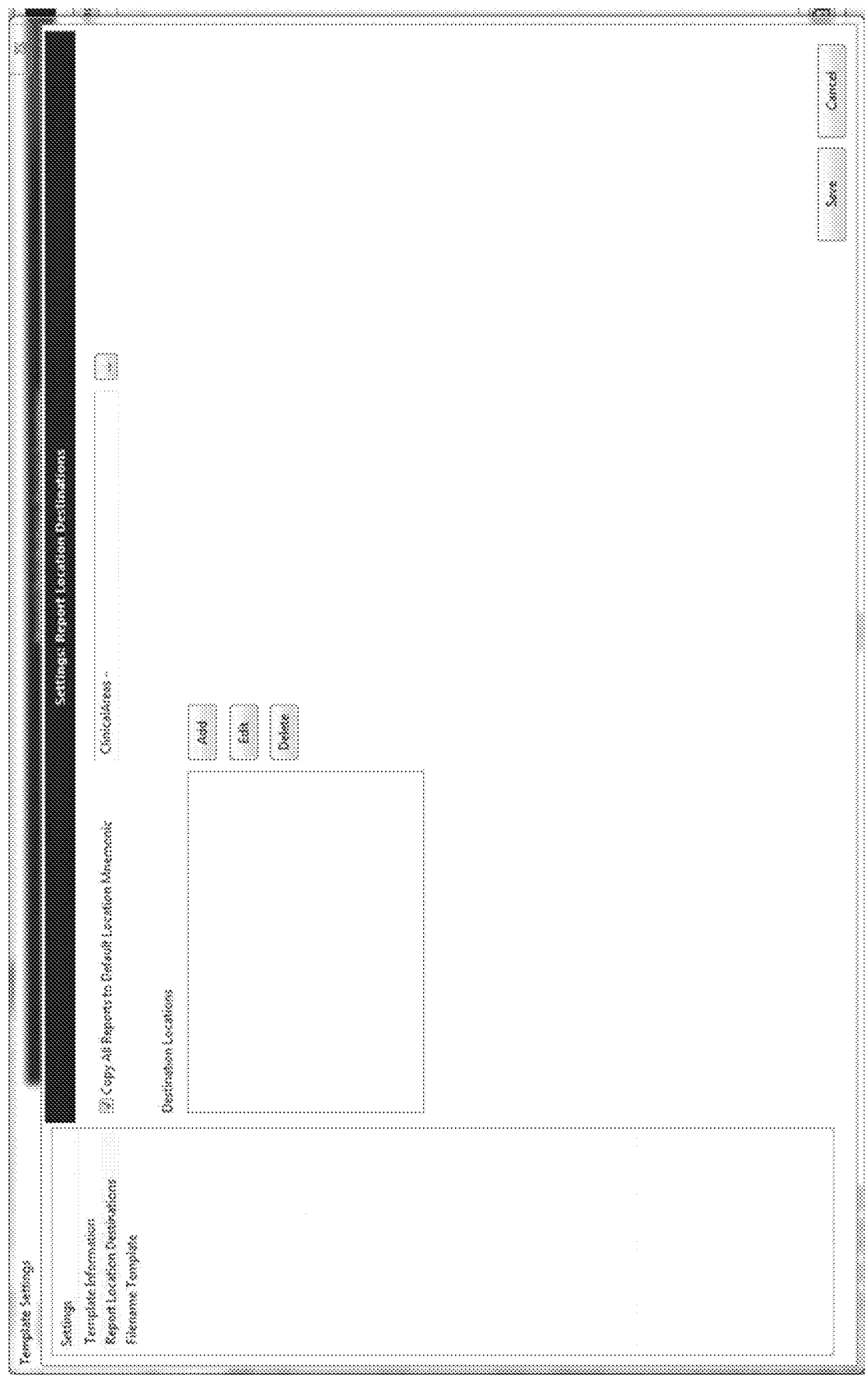

If the distribution group includes a general group of PC workstations that need to receive all instances of a specific report, the distribution group can be assigned to a report template. With reference to FIG. 3E, the user can navigate the cursor to the report Template menu, select the template the user wishes to send to the distribution group, and click the edit button. With reference to FIG. 3F, the user can select the report location destinations menu after navigating to the Add or Edit button. The user can then click the (Copy All Reports to Default Locations Mnemonics) check box, click on the " . . . " button next to the text field, and select the Distribution Group that should receive all copies of this report.

Active Directory

Figure 4A:
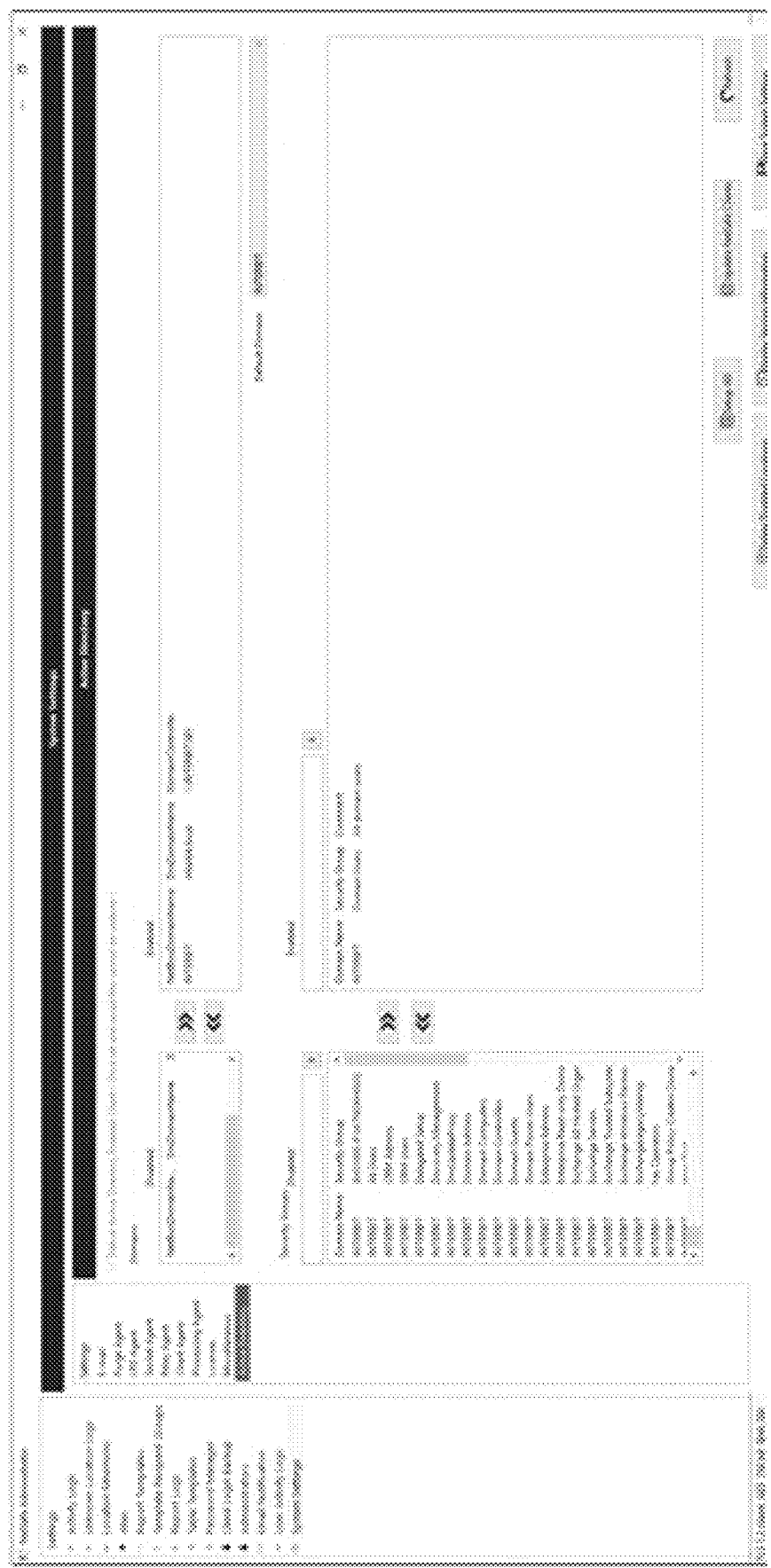

The user can set up an active directory within the system using the GUI presented in FIG. 4A. The active directory settings allow a user to specify, enable, and disable active directories and security groups. The active directory settings found under the system settings menu illustrated herein are global. Workstation specific settings can be set up under the location mnemonic menu described above. The location specific settings will override the global settings. Table 4 below lists and describes the Active Directory setting parameters.

TABLE 4

| Element | Description |
|---|---|
| Delivery Active Directory Enabled Client | Determines whether the Active Directory enabled system Client is delivered to the Location Mnemonic's Windows folder location. When selected, system downloads the latest version of the Active Directory enabled system 'Client along with the processed reports, if the latest version has not already been downloaded. Until the checkbox is selected, the traditional system Client login dialog box is used. |
| Domains; Disabled | Lists all the domains available on the network, but which have not been enabled for use when logging into a system Client. |
| >> | Moves highlighted domain name(s) between the Domains' Disabled and Enabled lists. |
| << | |

TABLE 4-continued

| Element | Description |
| --- | --- |
| Domains; Enabled | Lists all domains that have been enabled for use when logging into a system Client. |
| Default Domain | The Active Directory domain that is automatically used when logging into system Client, if a domain name is not included in User Name. If only one entry is included in the Domains' Enabled list, that entry is automatically entered in this text entry box. If more than one entry is included in the Domains' Enabled list, the first entry in the list is automatically entered in this text entry box. Change the entry by selecting another domain from the drop-down list. |
| Security Groups; Disabled | Lists all security groups that are included in the Domains' Enabled list, but have not been enabled for use when logging into a system Client. |
| >> | Moves highlighted security group(s) |
| << | between the Security Groups' Disabled and Enabled lists. |
| Security Groups; Enabled | Lists all security groups that have been enabled for use when logging into a system Client. |
| Setup AD | Sets up all Active Directories, moves Active Directories to the Domains' Enabled list. The first time system starts, the Active Directory database is empty. |
| System Clients Relay Queue | When you select the Update system Client button, that pushes out AD encrypted DB into the relay queue pending. |
| Refresh | Gets the current Active Directory database on the server and displays the contents of the database. |

Figure 4B:
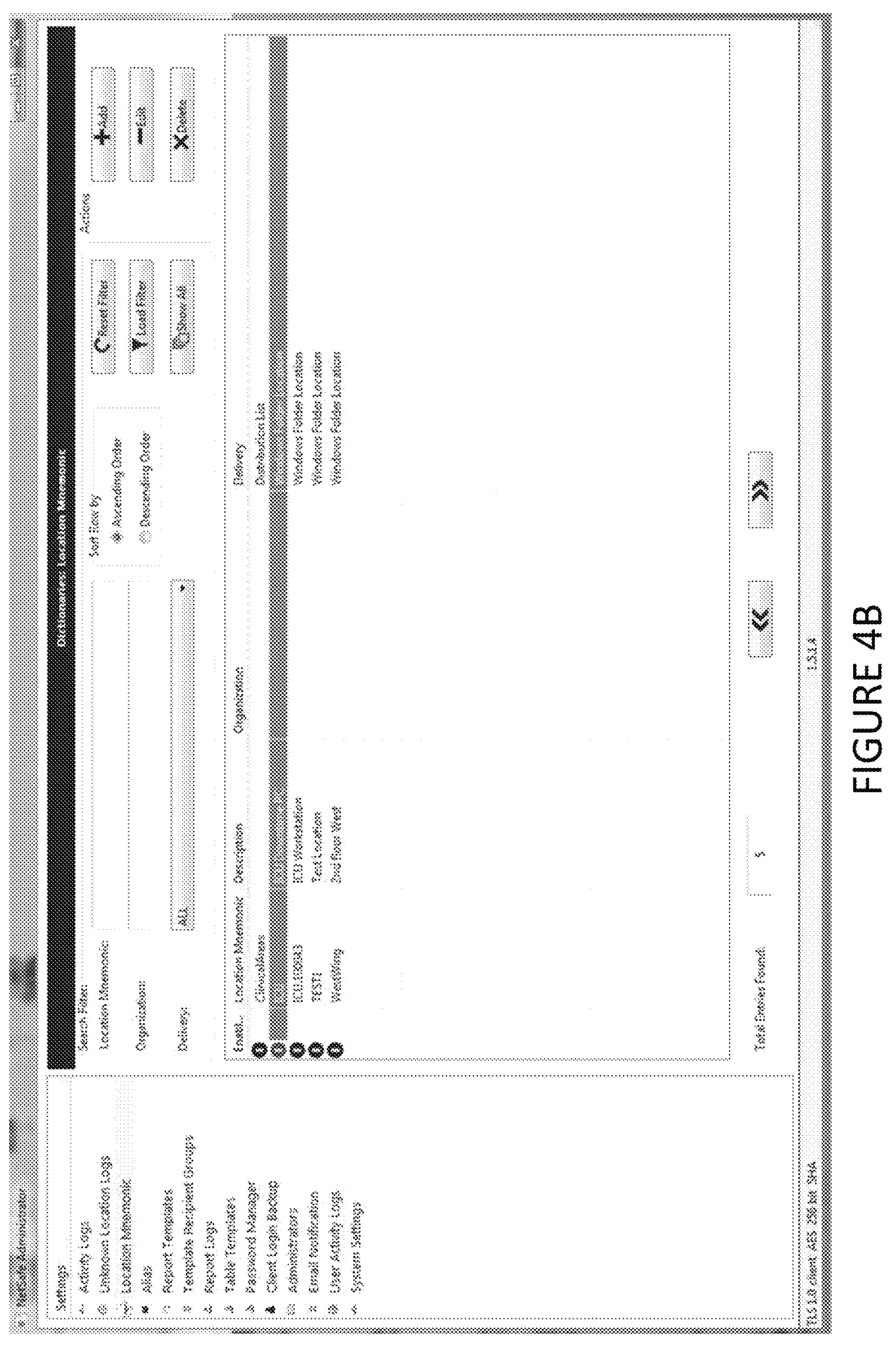

To enable active directory integration, a user can select the (Deliver Active Directory Enabled Client) check box and navigate through the prompts. A user can click on the Setup Active Directory button to obtain a list of available Domains. Domains that are to be granted access to the system Client will need to be moved from the Disabled table to the Enabled table. A user can move any security groups which should have access to log into the system Clients, over to the Enabled table. If the Security Group Enabled table is left blank, then all security groups have access to log into the system Clients. If there are multiple Domains, a Default Domain will need to be selected. Users in the Default Domain will not need to enter a Domain when logging into the System Client. Users not being logged into the Default Domain will need to enter in a Domain name as part of their login. With reference to FIG. 4B, a user can navigate to the Location Mnemonic menu, Add a new location or select an existing location, and Click the Edit button.

Figure 4C:
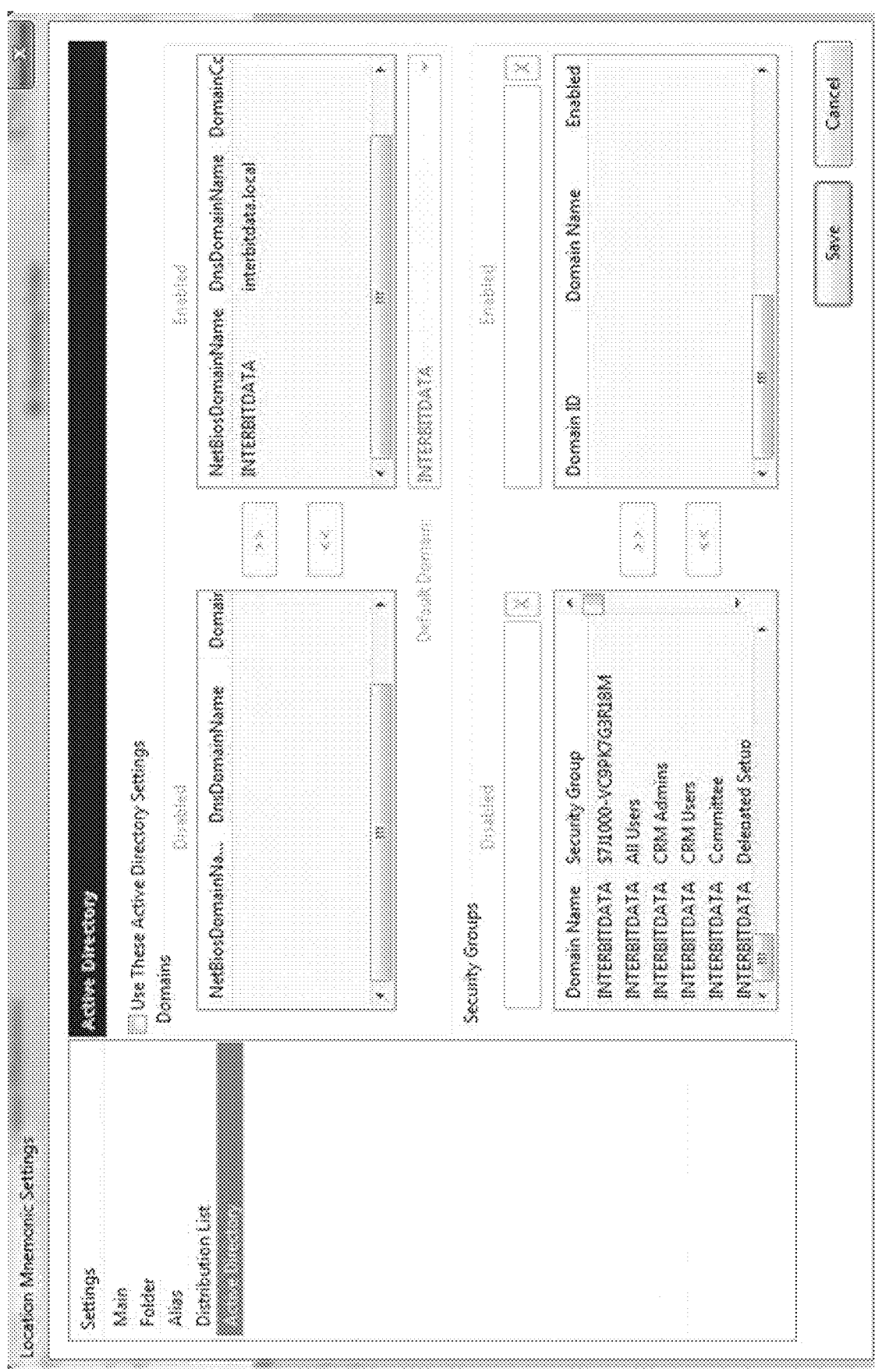

In order to set up an Active Directory for a specific location, with reference to the GUI in FIG. 4C, within the System Settings, a user can navigate to the Active Directory menu, enable the "Use These Active Directory Settings" check box, choose which Domains should have access to the specific location being edited, move the chosen Domains to the Enabled table, choose which Security Groups should have access to the specific location being edited, move the chosen Security Groups to the Enabled table, and save the settings.

To log into a system Client, users enter a user name and password. The system allows for the use of Active Directory accounts for logging into a system Client. The Active Directory settings allow a user to specify, enable, and disable Active Directories and Security Groups. Active Directory settings can be defined either globally, for all location mnemonics, or for an individual location mnemonic. It may be desirable to specify Active Directory settings for an individual location mnemonic. To specify the Active Directory settings for all location mnemonics, see "Active Directory Settings" in Chapter 15, "System Settings" in the Appendix appended to U.S. Provisional Patent Application No. 62/802,769, filed Feb. 8, 2019, which is incorporated by reference herein in its entirety. Table 5 below lists and describes the Active Directory settings:

TABLE 5

| Element | Description |
| --- | --- |
| Use These Active Directory Settings | Determines whether the Active Directory settings specified for this location mnemonic are used for logging into system Client. When selected, system downloads these settings, along with processed reports. If the latest version of the system Client has not already been downloaded, that is downloaded along with the report. Note: Active Directory settings for an individual location mnemonic are only downloaded if the Deliver Active Directory Enabled Client checkbox on the System Settings Active Directory dialog box is selected; see "Active Directory Settings" in Chapter 15, "System Settings". The Active Directory elements are inaccessible if the Use These Active Directory Settings checkbox is clear. |
| Domains; Disabled | Lists all the domains available when logging into a system Client on the network but have not been enabled for use. |
| >> | Moves highlighted domain name(s) between |
| << | the Domains' Disabled and Enabled lists. |
| Domains; Enabled | Lists all the domains that have been enabled for use when logging into a system Client. Note: If this list is empty, there are no entries in the Security Groups' Disabled and Enabled lists. |
| Security Groups; Disabled | Lists all of the security groups that are included in the Domains' Enabled list but have not been enabled for use when logging into a system Client. |
| >> | Moves highlighted security group(s) |
| << | between the Security Groups' Disabled and Enabled lists. |
| Security Groups; Enabled | Lists all the security groups that have been enabled for use when logging into a system Client. Caution: Users not included in this list are unable to log into a system Client. |
| Save | Saves the specified Active Directory settings. system creates a job in Relay Queue-Pending that downloads the system Client login database. The amount of time it takes to download the new settings depends on the number of jobs in the queue. |

The Active Directory settings allow you to specify which users can log into a system Client. To configure Active Directory settings, perform the steps illustrated in Table 6 below:

TABLE 6

| Step | Action |
| --- | --- |
| 1. | Click Active Directory. The features for specifying which users can log into system Clients display. |
| 2. | Click Deliver Active Directory Enabled Client. The Domains' Disabled list populates. |

TABLE 6-continued

| Step | Action |
| --- | --- |
| 3. | Highlight those domains that user wants to enable for system Client login. |
| 4. | Click >>. The highlighted domains are moved to the Enabled list. The security groups associated with the Domains' Enabled list are added to the Security Groups' Disabled list. |
| 5. | Determine whether the entry in the Default Domain text entry box is the domain user wants want used as the default when logging in to system Client: If yes, go to Step 6. If not the first time, go to Step 7. |
| 6. | From the Default Domain drop-down list, select the domain user wants used as the default when logging into system Client. Note: It is recommended that the default domain be the domain containing the most Active Directory accounts that will be logging into system Client. |
| 7. | Highlight those security groups that user wants to enable for system Client login. |
| 8. | Click >>. The highlighted security groups are moved to the Enabled list. |
| 9. | Determine whether this is the first time that Active Directory has been set up for this system installation. If the first time, go to Step 10. If not the first time, go to Step 11. |
| Note: If user is unsure whether Active Directory has been previously set up, proceed to Step 10. | |
| 10. | Click Setup AD. The Active Directory database with all data, domains, and security groups is set up The contents of the database are moved to the system Administrator The fields on the Active Directory Settings dialog box are populated |
| 11. | Click Update system Clients. A job is sent to Relay Queue-Pending. This job will update all system Clients with the currently specified Active Directory information. |
| 12. | Click Save System Settings. Caution: Once Deliver Active Directory Enabled Client has been selected and saved using the Save System Settings button, it cannot be undone. From that point onward, the Active Directory enabled system Client is used for all system Clients. |

System Client Configuration Setup

In some embodiments, after the system administrator processes reports the system administrator then encrypts the reports. The system administrator then delivers the reports to a workstation where they may be available for viewing during downtime by using the system Client.

Figure 5:
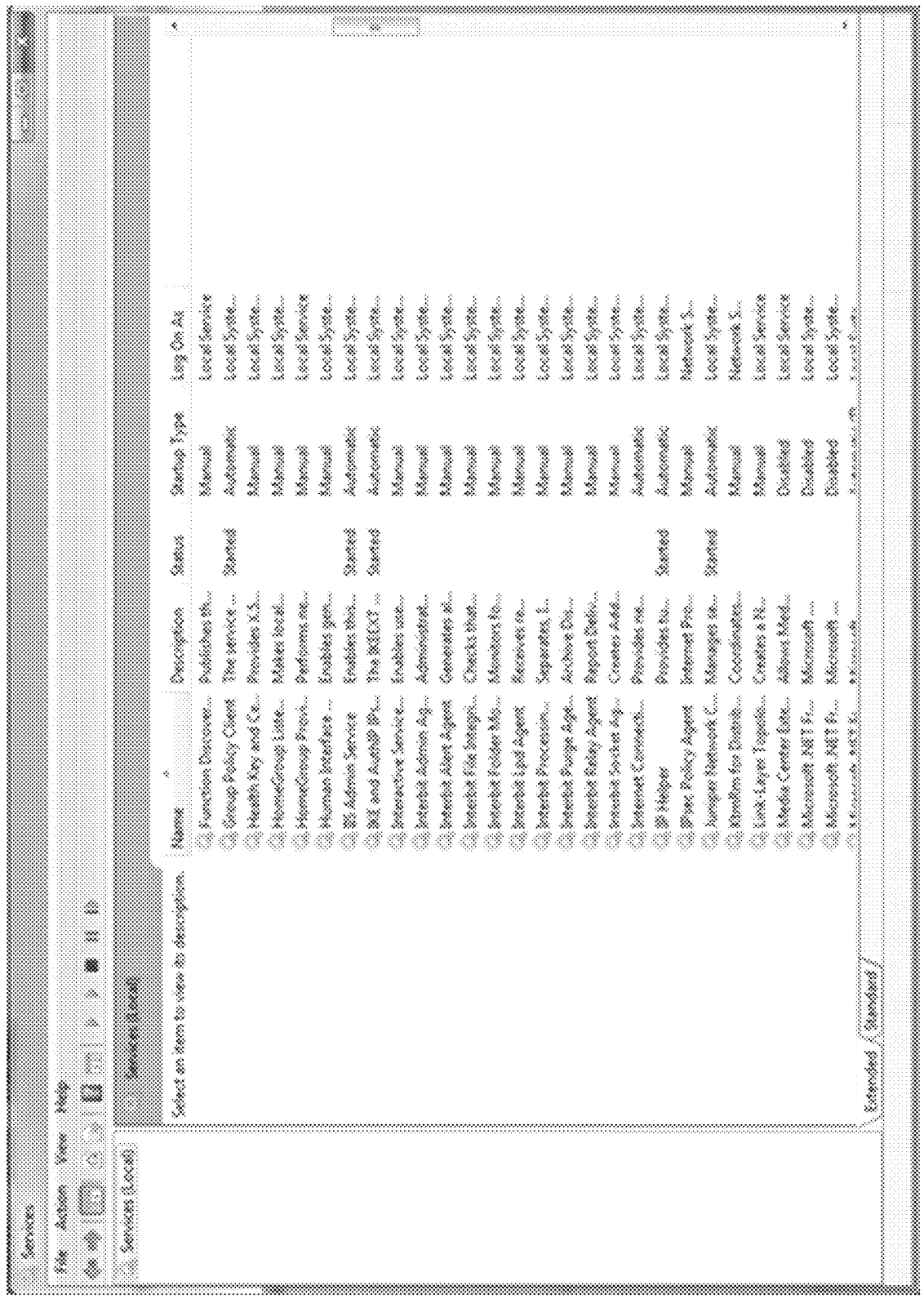

In some implementations, the system Client does not get installed. Rather, the Client is provided as an executable file (.exe) which is copied from the server to the shared folders along with patient reports. This permits the Client software to be accessed by a user from the shared folders. The system Client, when executed, decrypt's the reports on the workstation. The system Client can create an audit log to track access to the reports. The system Client can be configured to purge older reports from the workstation. A domain account should be assigned to run a variety of system services. The present discussion is directed to a Microsoft Windows® environment, but it will be appreciated that the system can be configured to run on any operating system as appropriate. A first Admin Agent service permits the certificate password for each Location Mnemonic to be changed at each workstation. A Relay Agent service allows the reports, certificates, databases, and client to be delivered to each workstation. A further Purge Agent service allows the reports, and databases to be purged based on the criteria setup in the system Administrator. A GUI showing a listing of the services is presented in FIG. 5. For each of the aforementioned services, to assign the account to the services, on the system server, in the services manager, double-click on each of the services mentioned above, navigate to the Log On tab, enter in the domain account name and password, click apply, and restart the service. It is possible to add a domain account to local users and groups. The domain account will also need to be added to the local administrator group on the system server.

Order of Operations in System Administrator

Overall, embodiments of the disclosed systems are preferably so as to direct information as it is sent from an initial source, such as a Healthcare Information System (HCIS) system, in the case of a hospital, to the system administrator, and then to the workstations where it resides in case of downtime. Sometimes, it is possible that a report may not be forwarded by the system.

Figure 6A:
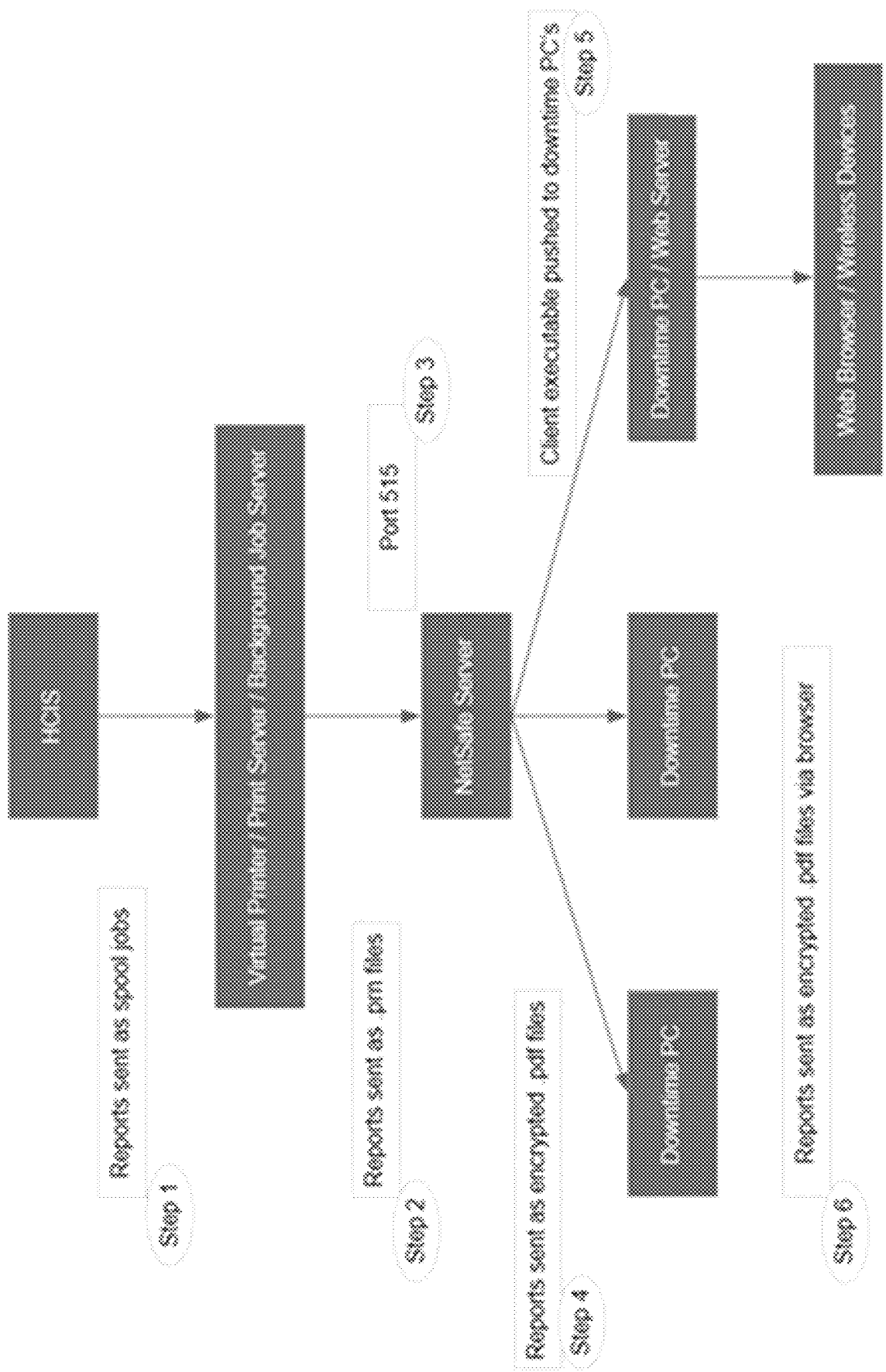

For purposes of illustration, and not limitation, as illustrated in FIG. 6A, reports to be isolated from a HCIS to be made available later are sent as spool jobs to a virtual printer, print server or background job server. Reports are sent as .PRN files through a printer port (e.g, Port 515) to a dedicated secured server that is firewalled from the HCIS. The secure server then generates document files, such as PDF files, from the print files that are delivered through the printer port. An executable system Client file can then be pushed to other real or virtual machines in the HCIS network. The secure server also encrypts the document (e.g., PDF) files and forwards them to appropriate machines in the network in accordance with user selected criteria. It will be appreciated that the executable files can be sent alone, or with one or more of the encrypted PDF documents. This permits the pushed executable file to be run, for example, if the rest of the system is down to access the encrypted PDF files.

Figure 6C:
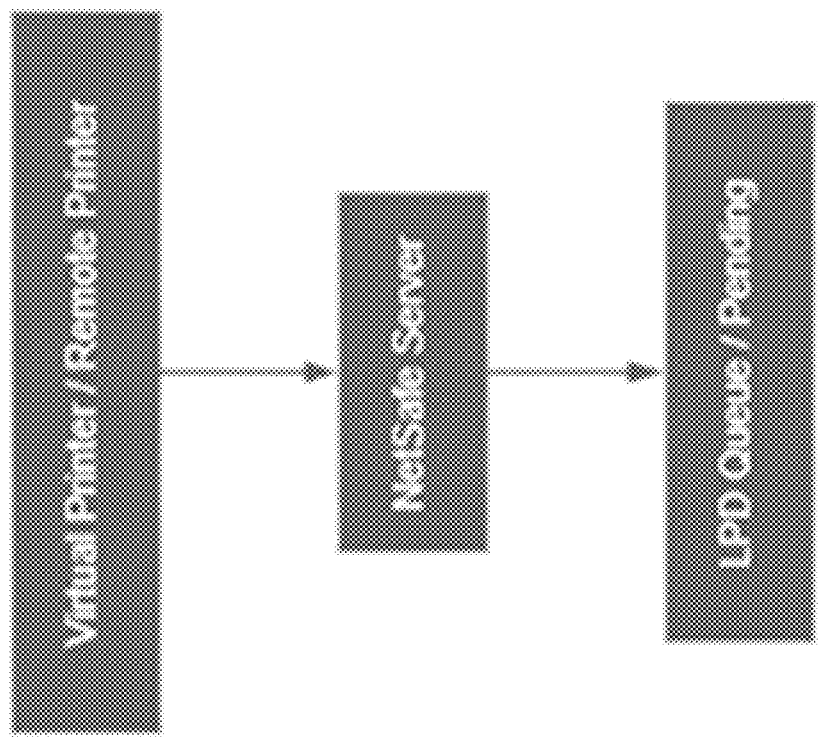
Figure 6B:
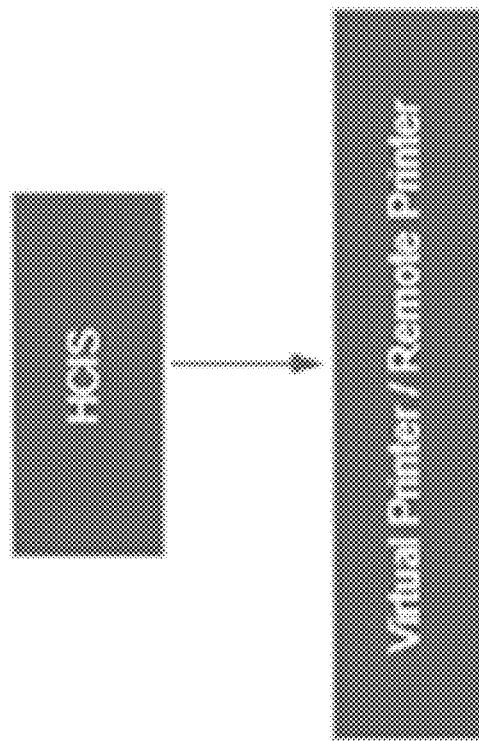

With reference to FIG. 6B, in this illustration, HCIS reports may be sent to different types of printers, which then route the print files to the secure server. The remote printers and or operating system virtual printers can send reports over to the secure server through the LPD port, which is port 515, as illustrated in FIG. 6C. In addition to port 515, the secure server can "listen" or monitor other TCP ports.

Figure 6E:
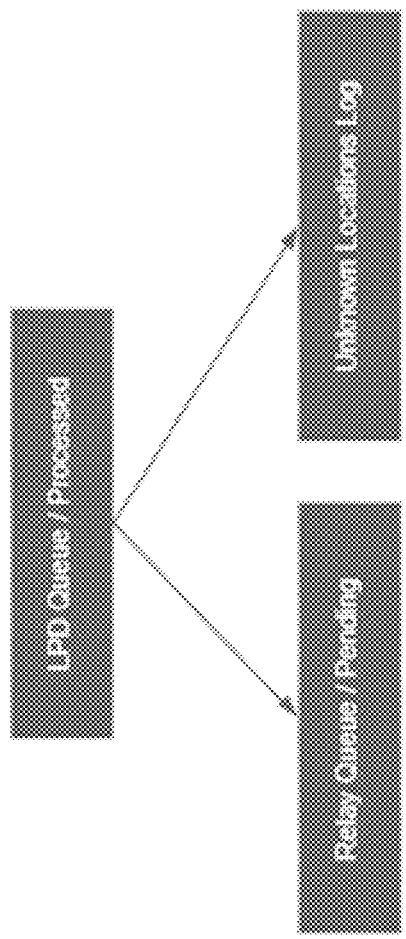

With reference to FIG. 6D, the report is received by the ILPD Agent service, running on the secure server. The report appears as a print file under the LPD Queue Processed database. From the LPD Queue Processed database, the report is taken by the Processing Agent service running on the secure server, and it is processed through a report template. If the report runs into any errors while processing through the template, the report is moved in to the LPD Queue Error database. If the report does not run into any errors while processing through the template, the report is moved to the LPD Queue—Processed database (FIG. 6E).

After the report has been processed through a template successfully by the secure server, it is sent to the Relay Queue/Pending database. The report is then taken up by the Relay Agent service running on the secure server. If the report is processed through the template successfully; but the system cannot identify which location it should be sent to, the report is then moved to the Unknown Location Logs as illustrated in FIG. 6E.

Figure 6F:
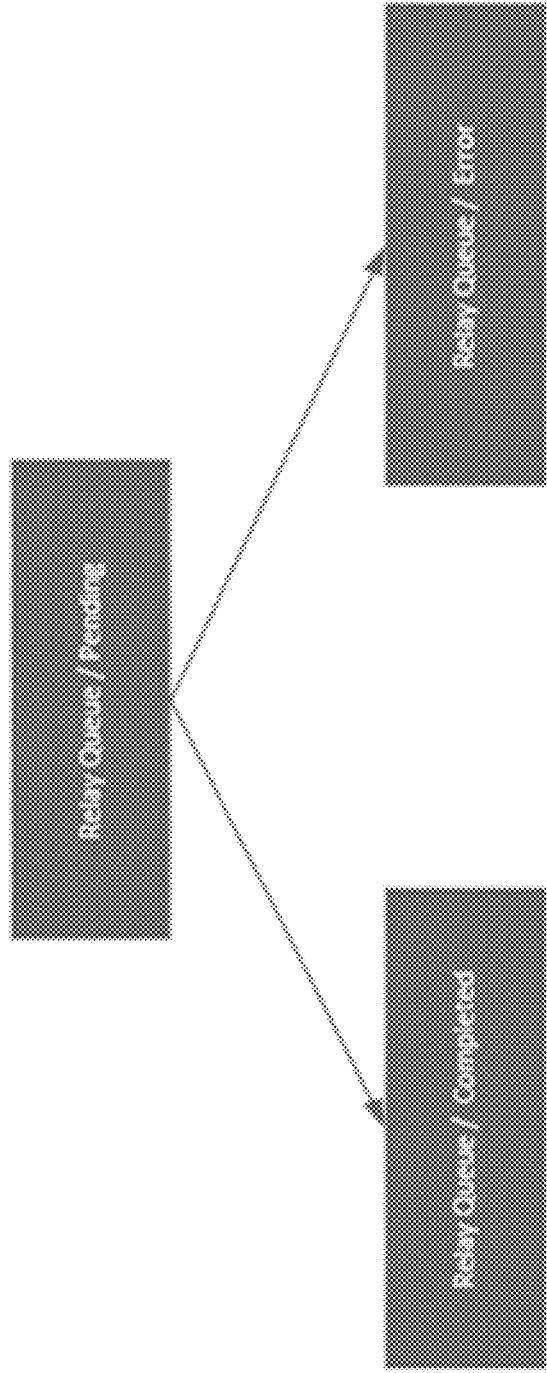

With reference to FIG. 6F, the Relay Agent service running on the secure server will attempt to deliver the report to its intended destination. If the report is delivered successfully to the destination workstation, then it is moved to the Relay Queue—Completed database. If the report was not delivered successfully to the destination workstation, then it can remain in the Relay Queue—Pending database and the secure server can try to send it again after a predetermined (e.g, 10-minute) delay or it can be moved to the Relay Queue—Error database. A report that fails to be delivered may also be sent to an Alternate Delivery Folder. Which action is taken will depend on the Alternate Delivery Folder settings, found under System Settings->Relay Agent.

Figure 6G:
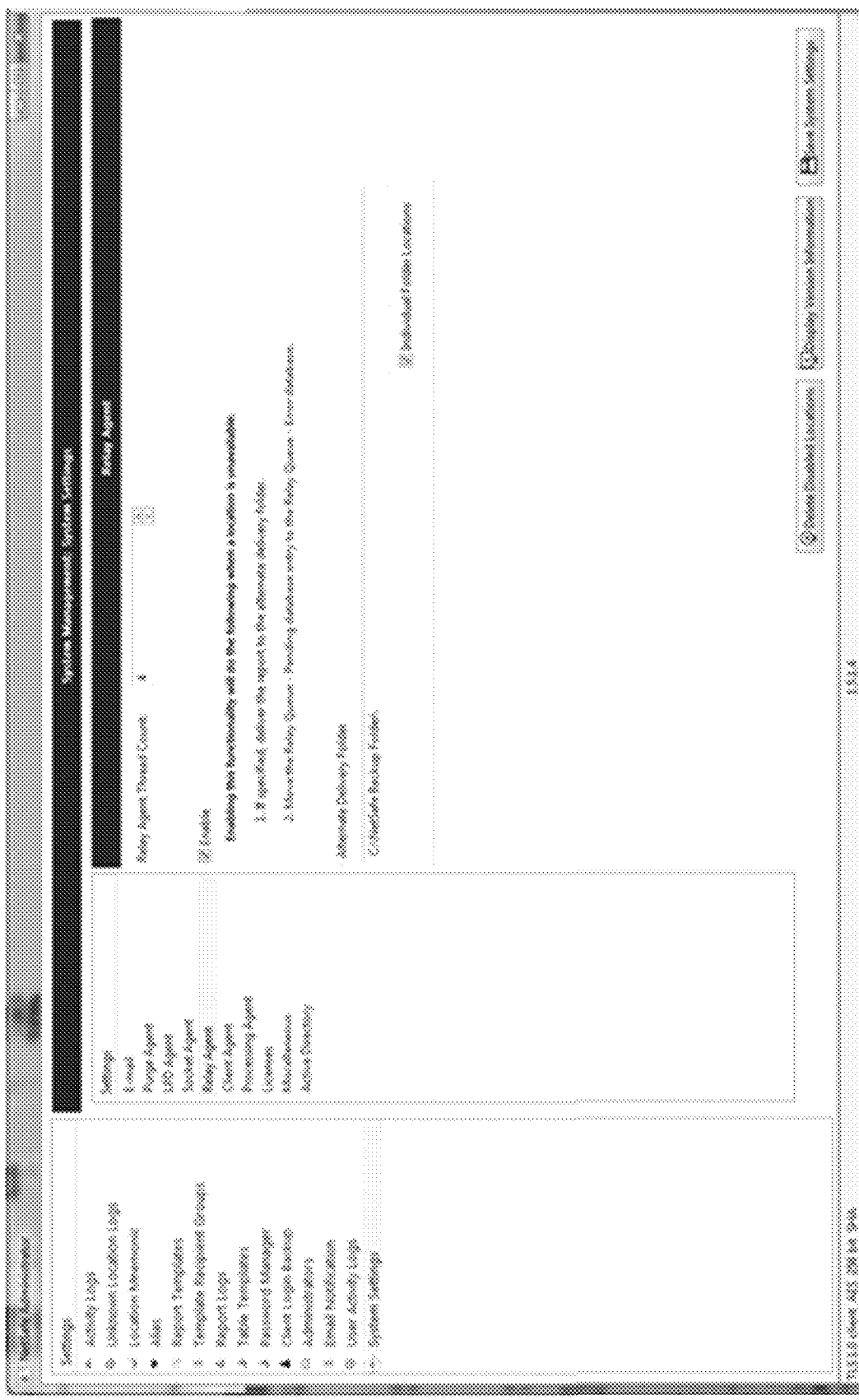
Figure 6H:
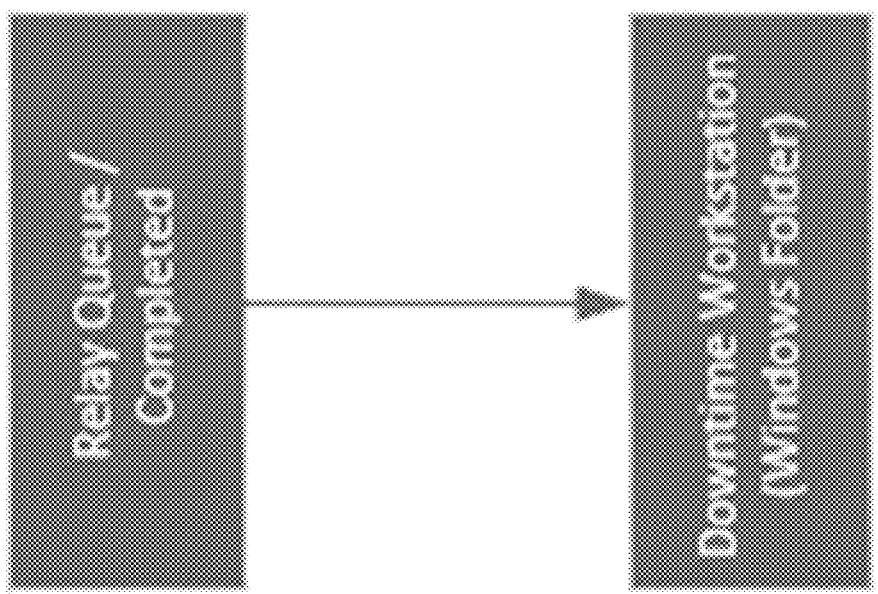

With reference to FIGS. 6G and 6H, reports that are in the Relay Queue—Completed database have been delivered by the Relay Agent service to the destination workstation. These reports are sent over as PDF documents. The Reports are preferably encrypted using 256-bit AES (advanced encryption standard) encryption. If a system Client (e.g., in the form of an executable program file) is not present at the destination location, the Relay Agent service on the secure server will send a copy of the Client to that folder as well. At this point, encrypted reports are now located on the downtime workstation. End users may interact with the reports by opening the Client application (.exe file), which allows them to decrypt the reports, view or print them. Email alerts may be setup to monitor the flow of information through the different databases which are described above. Email alerts can then be sent if a report fails to progress through one of these steps.

Filename Templates

Once a report is identified and separated from a batch report, for example, it needs to be given a filename. Unseparated reports also need a filename. Using the features in the Filename Template Dialog discussed below, it is possible for a user to specify the filename assigned to a report. The filename can be, for example, a static text string, a name that is created from text captured from the report, or a combination of both. Filenames can be used in several places within the disclosed system. For example, filenames can be used to track reports within the system Administrator application, or to see if a report has been processed or delivered. Filenames can appear in Email alerts, letting administrators know which reports are having problems. The filenames display to the end users in the system Client and allow end users to more easily filter, organize and search for reports.

Figure 7A:
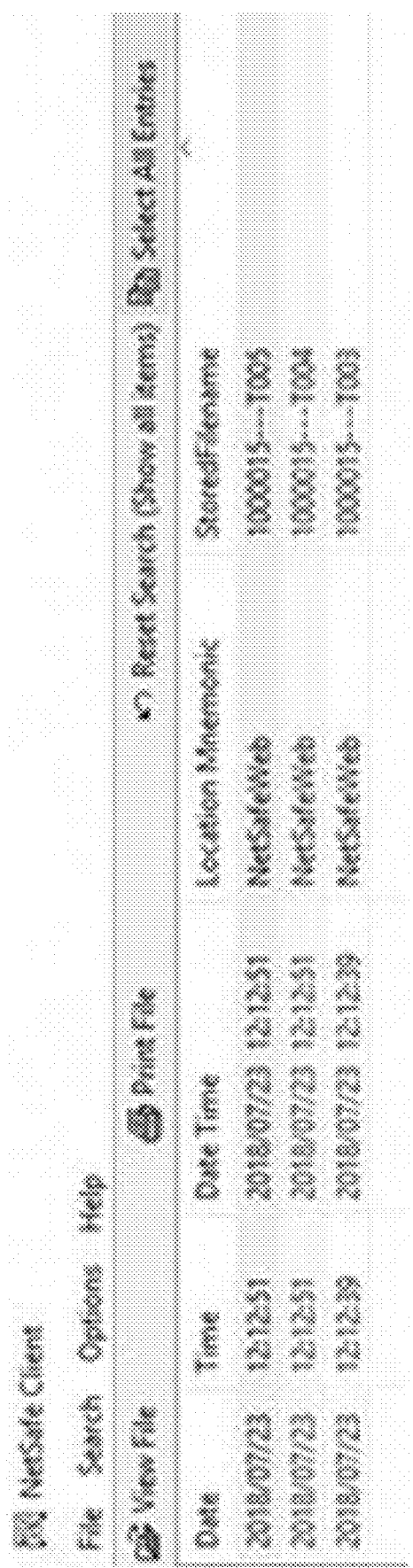
Figure 7B:
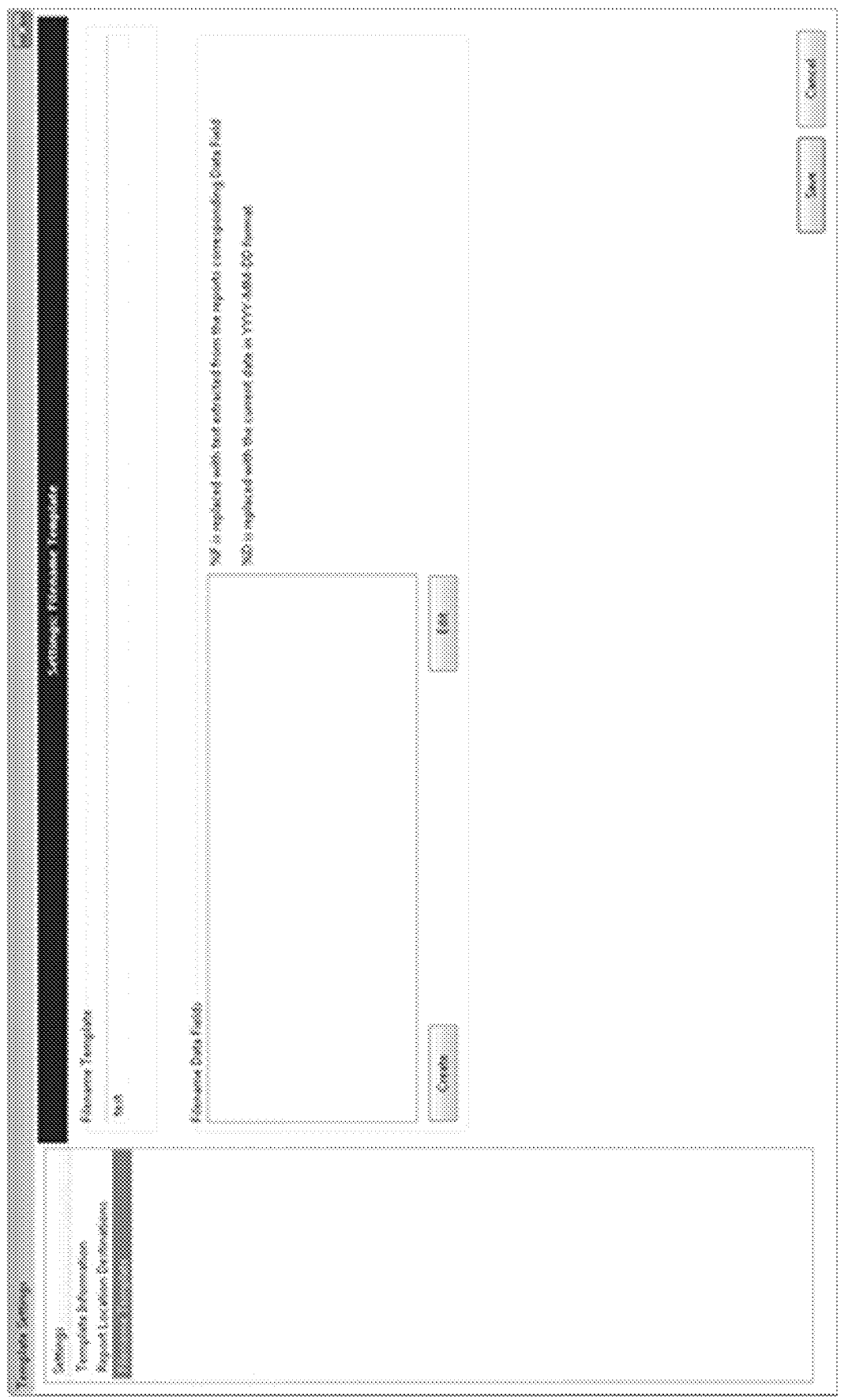

With reference to FIG. 7A, each report can be assigned a filename. Reports can be built within a Report Templates menu. Filenames can be built within a template under a Filename Template menu. Filename Template Dialog as illustrated in FIG. 7B and in Table 7 below.

TABLE 7

File Name Template Element

| Element | Description |
| --- | --- |
| File Name Template | The template for the file name to be assigned to the report.<br>In this text entry box, enter a combination of static text strings and variable text identifiers (% F and % D) |

The process of defining a filename for the report can be a two-step process. First, a user creates the format for the filename, that is, its template. Second, a user can formulate rules to locate the data on the report. The data can be entered in the variable fields within the filename template. Filenames can include free text and variable fields. Free text is any text that is entered manually and will remain static or unchanging within the filename. A variable field is text that can be extracted from within the report, and placed in to the filename. The variable field can change as it is dependent on the text in the report. Variable fields can help make filenames unique.

Figure 7C:
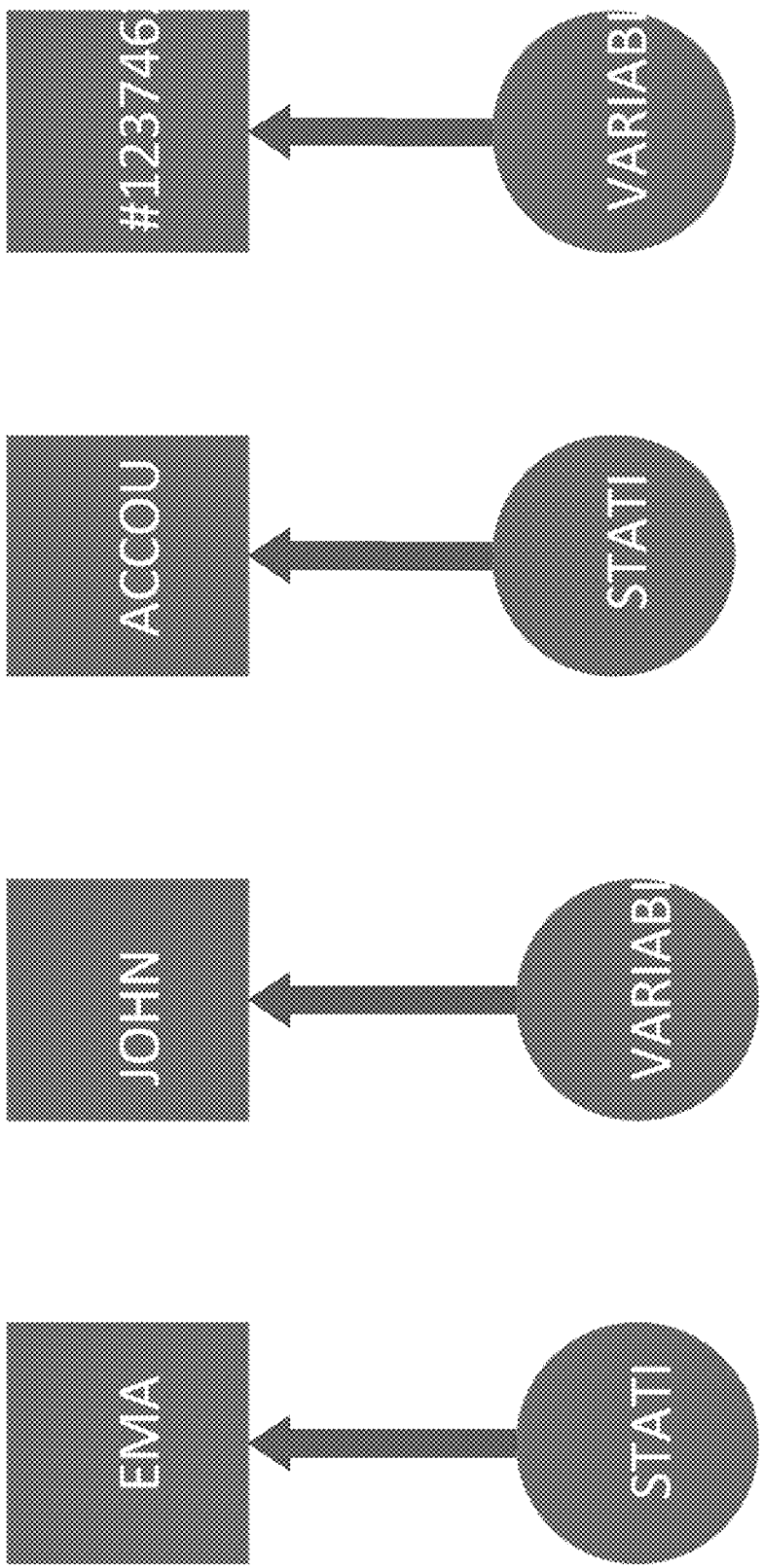

FIG. 7C presents examples of file names. A user can decide what a filename should look like. The user can designate a filename, for example, on whether the report is for a specific patient, whether the report is for a specific location, or whether the report is only being delivered to specific workstations, for example.

In accordance with one illustrative example, an EMAR (electronic medication administration record) is usually separated by individual patients so a filename will contain information about the patients, such as the patient name, account number, unit number, and location:

| EMAR | John Doe | Acct # 143435465368 | ICU |

In accordance with further embodiments, the secure server of the system can be configured to permit a user to automatically capture and preserve information, such as patient information, generated from an information system, such as a HCIS. This information can then be sent at regular intervals and stored on local PCs, for example. The patient information can thus be stored as a backup strategy in the event of a network or system outage, such as one due to a cyberattack or other compromising event. The system can permit a user to access this patient information, which can be stored, for example, as PDF files for lookup, review, and/or printing. This eliminates the need for continuous printing of patient reports, substantially reduces paper usage, and saves hours of work generating the reports locally. Having up-to-date patient information whenever it is needed ensures access to the information when systems or networks are unavailable. It will be appreciated that this can facilitate the delivery of quality patient care.

Once installed and configured, embodiments in accordance with the present disclosure permit a user, such as a system administrator, to define rule-sets that are formulated based on the needs and requirements of a particular organization. These rule-sets can capture different types of reports and documents, and automatically direct them to a hard drive on a PC or to a printer. A secure server can receives reports on a scheduled basis from the HCIS in the form of print files, convert the print files to PDF documents and encrypt them for distributing them to workstations throughout the facility (e.g., hospital). These reports reside on those workstations until a downtime occurs at which point users may access the reports and use them to work through the downtime.

In planning which workstations should be used to receive downtime reports, there are several criteria which should be considered. It can be advantageous for the workstation to be located in an area that can be easily accessed by end users that will need to view downtime reports. It is also useful if the downtime workstation is connected to a backup power supply in case the facility suffers a power outage. It is also useful for the workstation to have a printer physically connected to it, or one connected nearby, that is also connected or connectable to an alternate power supply. Also, it is best to not select a workstation that tends to be turned off periodically or frequently, such as at the end of a shift. The secure server needs to be able to send reports to workstations that are able to receive them constantly to ensure that if a downtime does occur, that the workstations have the latest reports.

Logging in to System Client to Access Information

To log in to a system Client, users are required to enter a user name and password. Normally, this would be the users' their Active Directory user name and password. However, there may be occasions when connectivity between the Active Directory server and the system Client is lost such that logging in is not possible in this manner. In this situation, users can use a backup login user name and password and the system (Client executable file) should be so configured. Thus, an associated Client Login Backup dialog can be provided in the system, accessible by a system administrator on the secure server, to permit a user to specify one or more backup login user names and passwords for use when connectivity between the Active Directory server and the system Client is lost.

Figure 8A:
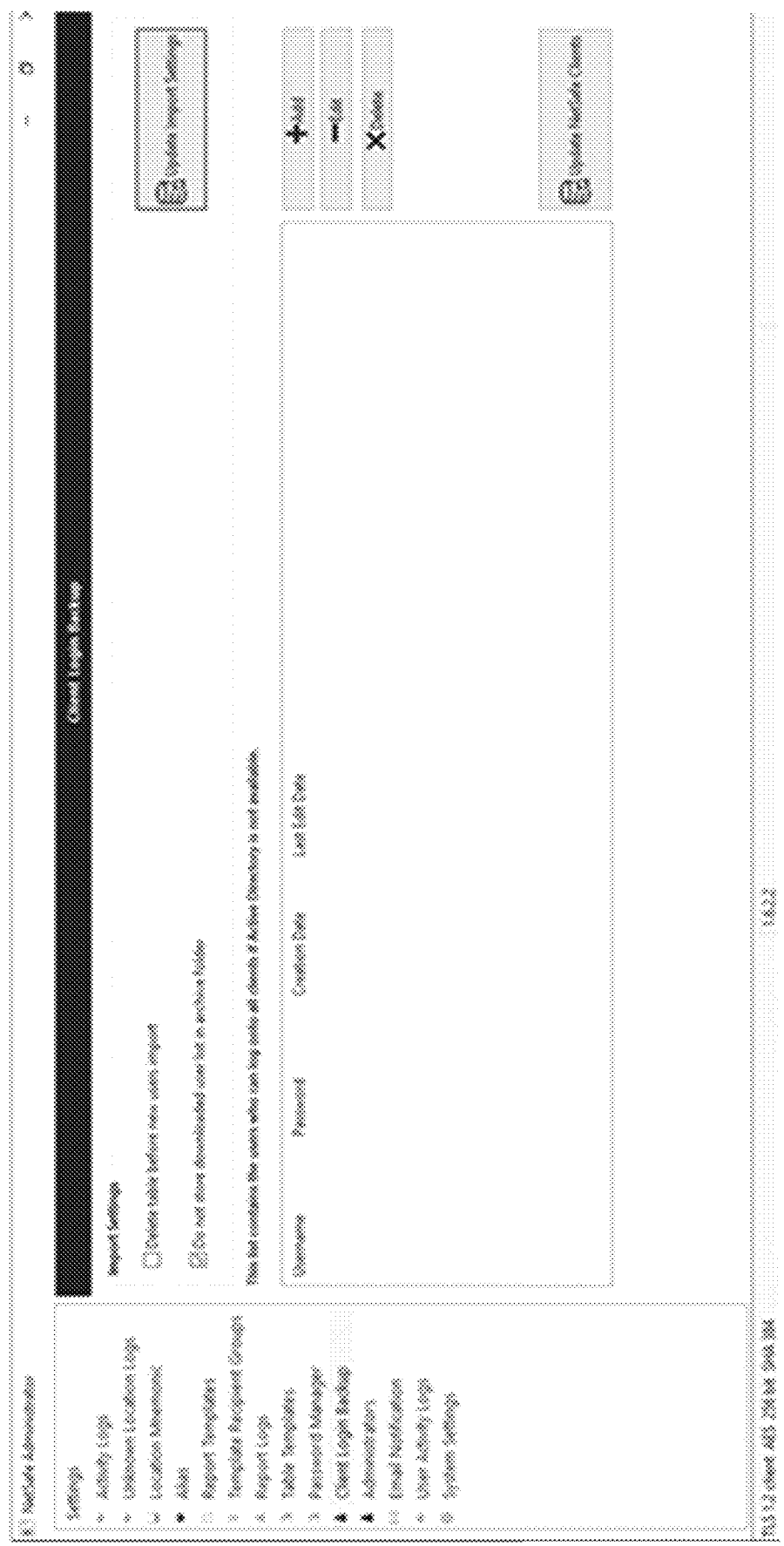

With reference to FIG. 8A, when a user selects the Client Login Backup item in the Settings list of the GUI of the software running on the secure server prior to a system outage, the Client Login Backup dialog settings displays. The settings on the dialog are divided into Import Settings, and the list of Client Login Backup accounts, as set forth in Table 8 below:

In further accordance with the disclosure, a report can be set up to automatically populate the list of users in the Client Login Backup. The LPD Queue name userloginsimport can be used to indicate to the system that the report contains data that can be imported into the Client Login Backup database. In accordance with some embodiments, the report can use the following data structure format:

username password

For example:

| username | password |
|---|---|
| obstectrics | pass1234 |
| maternity | pass5678 |
| emergency | passABCD |

These procedures can be observed if the Active Directory system Client is enabled in the System Setting. To log into a system Client, a user is required to enter their username and password found in Active Directory. This is done through communication between an Active Directory domain controller and the client location. However, there may be occasions when connectivity between the Active Directory domain controller and the system Client is lost. In this situation, users will need to specify a username and password that is found within the Client Login Backup database to gain access to the client.

In further accordance with the disclosure, when Client Login Backup accounts are downloaded to the system Clients, there are settings that can be specified and applied for each download. To specify update settings, a user can perform the following steps set forth in the below Tables.

TABLE 8

Client Login Backup Element

| Element | Description |
|---|---|
| Delete table before new users import | Determines whether the existing Client Login Backup database is deleted before the user names and passwords from the report are imported. |
| Do not store downloaded user list in archive folder | Determines whether the downloaded report containing the user data is stored in the archive folder |
| Update Import Settings | Saves the settings specified for Delete table before new users import and Do not store downloaded user list in archive folder. Subsequent downloads of the Client Login Backup table use these settings. |
| Add | Displays the Login User dialog box. Use this dialog box to specify the user name and password for a client backup login account. |
| Edit | Displays the Login User dialog box for the highlighted login user name. |
| Delete | Deletes the highlighted login user name. |
| Update system Clients | For each enabled Location Mnemonic, an entry is added to the Relay Queue-Pending that delivers an encrypted database to the local PC. This database contains all the Active Directory and Client Login Backup settings. |

TABLE 9

To specify update settings, a user can perform the following steps.

Step  Action

1. Click the Client Login Backup item in the Settings list.
   The Client Login Backup dialog displays
2. Determine whether the current entries in the Client Login Backup table should be deleted before a new table is stored in the system:
   If yes, select Delete table before new users import, then go to Step 3.
   If no, clear Delete table before new users import, then go to Step 3
3. Determine whether the report containing the username and password data should be stored in the system's archive folder:
   If yes, clear Do not store downloaded user list in archive folder, then go to Step 4.
   If no, select Do not store downloaded user list in archive folder, then go to Step 4.
4. Click Update Import Settings.
   Subsequent imports of the Client Login Backup table use the specified settings.

TABLE 10

To configure Client Login Backup accounts, a user can perform the following steps.

Step  Action

1. Click the Client Login Backup item in the Settings list on the main dialog.
   The Client Login Backup dialog displays
2. Click the Add button.
   The Client Login Backup User dialog box displays.
3. In the Username text entry box, enter the user name to be used for logging in to system Client.
   Note: This field cannot be blank
4. In the Password text entry box, enter the password to be used for logging in to system Client.
   Note: This field cannot be blank.
5. Click Save.
   The specified Client Login Backup account is added to the list of accounts.
6. Determine whether you want to specify another Client Login Backup account:
   If yes, go to Step 2.
   If no, go to Step 7.
7. Click Update system Clients.
   A dialog indicating that a background job has been started to update each of the system Client locations appears.
   Click OK to continue.
   Depending on the number of reports in the queue Relay Queue -Pending, this process might take some time to complete.

TABLE 11

To edit a Client Login Backup account, a user can perform the following steps.

Step  Action

1. Click the Client Login Backup item in the Settings list on the main dialog.
   The Client Login Backup dialog displays.
2. Highlight an entry in the list view to edit.
3. Click the Edit button.
   The Client Login Backup User dialog box displays.
4. In the Username text entry box, enter the user name to be used for logging into system Client.
   The username can be changed and the highlight entry in the list view will be updated with the new username.
   Note: This field cannot be blank.
5. In the Password text entry box, enter the password to be used for logging into system Client.
   Please be sure to highlight the original password and delete the entry before entering a new password.
   Note: This field cannot be blank. The Password Type is specified as Plain Text when adding a new account. When the account login is saved, the password is encrypted.

TABLE 11-continued

To edit a Client Login Backup account, a user can perform the following steps.

Step  Action

Thus, the text string that displays in the Client Login Backup list is a string of asterisks,
      and the number of characters may be different from those entered on the Login User
      dialog box. When you edit an account, the Password Type is specified as Encrypted,
      and the text string is different from what was entered when the account was initially
      created.
6.   Click Save.
      The selected Client Login Backup account is updated to reflect the changes made in the
      dialog.
7.   Determine whether you want to edit another Client Login Backup account:
      If yes, go to Step 2.
      If no, go to Step 7.
8.   Click Update system Clients.
      A dialog indicating that a background job has been started to update each of the system
      Client locations appears.
      Click OK to continue.
      Depending on the number of reports in the queue Relay Queue-Pending, this process
      might take some time to complete.

After these parameters have been set, an administrator can communicate this information to those individuals accessing the system Client.

Figure 9:
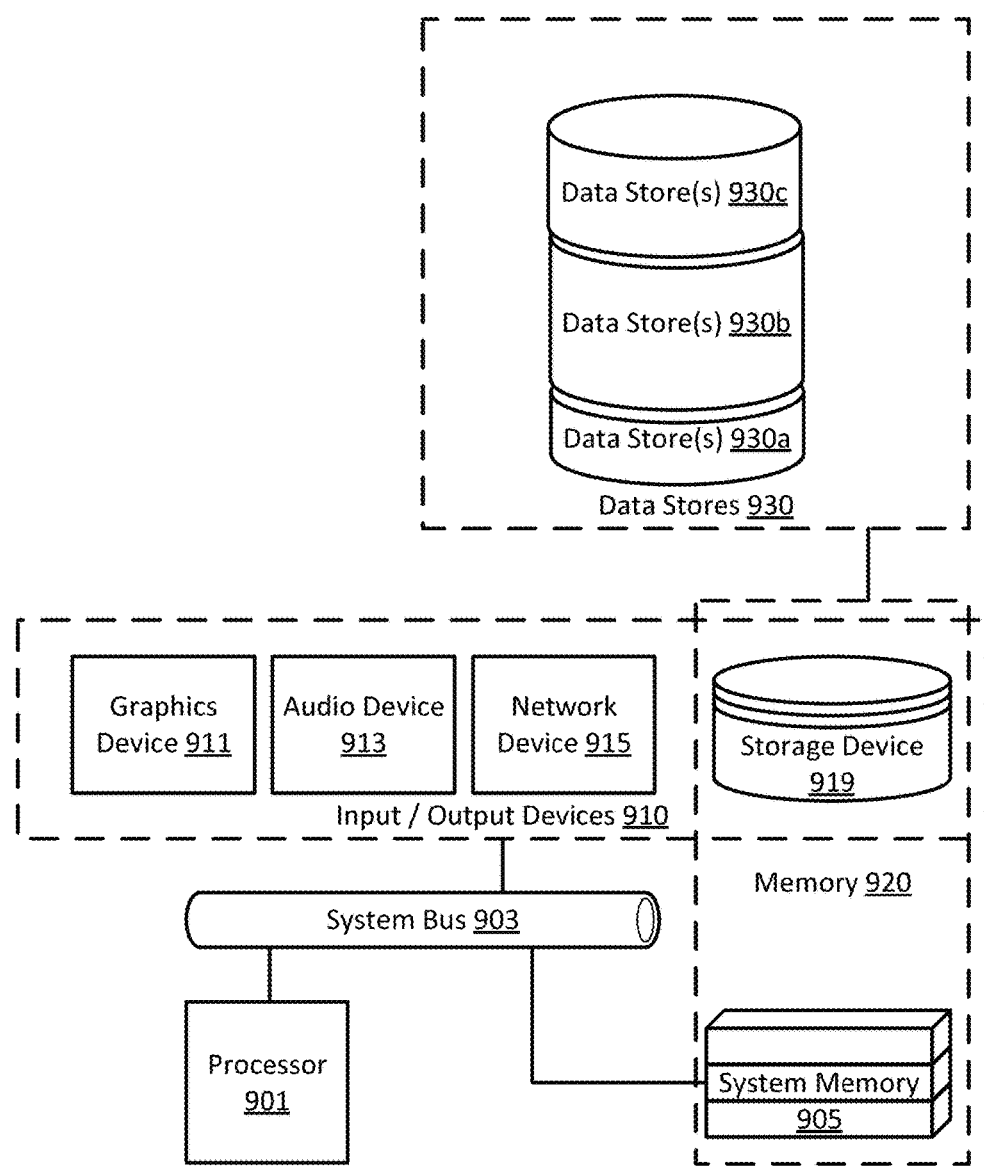
FIG. 9 illustrates a coordinator in accordance with the present disclosure.

FIG. 9 shows a block diagram illustrating an exemplary system coordinator in one embodiment of the disclosure. The system coordinator, such as the secure server disclosed herein. The system coordinator facilitates the determination of relative importance of entities within a network via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the system coordinator may receive, obtain, aggregate, process, generate, store, retrieve, send, delete, input, output, and/or the like data (including program data and program instructions); may execute program instructions; and may communicate with computer systems, nodes, users, and/or the like. In various embodiments, the system coordinator may comprise a standalone computer system, a distributed computer system, a node in a computer network (i.e., a network of computer systems organized in a topology), a network of system coordinators, and/or the like. It is to be understood that the system coordinator and/or the various system coordinator elements (e.g., processor, system bus, memory, input/output devices) may be organized in any number of ways (i.e., using any number and configuration of computer systems, computer networks, nodes, system coordinator elements, and/or the like) to generate a relative importance of workstations, for example, in accordance with the disclosure. Furthermore, it is to be understood that the various coordinator computer systems, coordinator computer networks, coordinator nodes, coordinator elements, and/or the like may communicate among each other in any number of ways to facilitate system operation. As used in this disclosure, the term "administrator" or "user" refers generally to people and/or computer systems that interact with the system; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

System Coordinator

The system coordinator includes a processor 901 that executes program instructions (e.g., system program instructions). The processor may be implemented using integrated circuits (ICs), application-specific integrated circuits (ASICs), field-programmable gate arrays (FPGAs), and/or the like. The processor may be connected to system memory 905 via a system bus 903. The system bus may interconnect these and/or other elements of the system coordinator via electrical, electronic, optical, wireless, and/or the like communication links. In various embodiments, the system bus may comprise one or more control buses, address buses, data buses, memory buses, peripheral buses, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices 910 may be connected to the processor and/or to the system memory, and/or to one another via the system bus. In some embodiments, the input/output devices may include one or more graphics devices 911. The processor may make use of the one or more graphic devices in accordance with program instructions (e.g., system program instructions) executed by the processor. The graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 913. The processor may make use of the one or more audio devices in accordance with program instructions (e.g., system program instructions) executed by the processor. In one implementation, an audio device may be a sound card that may obtain (e.g., via a connected microphone), process, output (e.g., via connected speakers), and/or the like audio data (e.g., system data). The audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 915. The processor may make use of the one or more network devices in accordance with program instructions (e.g., system program instructions) executed by the processor. In one implementation, a network device may be a network card that may obtain, process, output, and/or the like network data (e.g., system data). The network device may be discreet, external, embedded, integrated into a motherboard, and/or the like. The network device may operate in combination with other network devices (e.g., in parallel) to provide improved data throughput, redundancy, and/or the like. In some embodiments, the input/output devices may include one or more storage devices 919. The processor may access, read from, write to, store in, erase, modify, and/or the like a storage device in accordance with program instructions (e.g., system program instructions) executed by the processor. A storage device may facilitate accessing, storing, retrieving, modifying, deleting, and/or the like data (e.g., system data) by the processor. In one implementation, the processor may access data from the storage device directly via the system bus. In another implementation, the processor may access data from the storage device by instructing the storage device to transfer the data to the system memory and accessing the data from the system memory.

The storage device 919 may be discreet, external, embedded, integrated (e.g., into a motherboard, into another storage device), and/or the like. A storage device 919 may operate in combination with other storage devices to provide improved capacity, data throughput, data redundancy, and/or the like. Together and/or separately the system memory 905 and the one or more storage devices 919 may be referred to as memory 920 (i.e., physical memory).

System memory 920 contains processor-operable (e.g., accessible) system data stores 930. Data stores 930 comprise data that may be used (e.g., by the system) via the system coordinator. Such data may be organized using one or more data formats such as a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Data stores 930 may comprise a non-transitory machine readable medium storing instructions executable by processor 901 to perform a specified function. Accordingly, each of the respective data stores 930a-930c include programmatic instructions which, when executed by processor 901, provide for carrying out the steps of the systems described elsewhere herein.

For example, data stores 930a-930c may include instructions executable by processor 901 to retrieve from at least one database structured to recognize relations between the entities and the company, information regarding competitive suppliers of each of the plurality of entities, revenue information for each of the plurality of entities, and industry segment information for each of the plurality of entities.

Data stores 930a-930c may also include instructions executable by processor 901 to generate for display on a graphical user interface a first display including information for storing or processing reports as described herein, and provide for carrying out the steps of the systems described elsewhere herein.

Data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, system coordinator elements, and/or the like) to facilitate system operation. For example, system data stores may comprise data stores 930a-c implemented as one or more databases.

The entirety of this disclosure (including the written description, figures, claims, abstract, appendices, and/or the like) for SYSTEMS, METHODS AND MACHINE READABLE PROGRAMS FOR ISOLATION OF DATA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure.

Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the system coordinator, system coordinator elements, system data stores, system components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the system coordinator, system coordinator elements, system data stores, system components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure.

Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, non-provisional applications, continuation applications, continuation-in-part applications, divisional applications, and/or the like. It is to be understood that while some embodiments of the system discussed in this disclosure have been directed to monitoring real time electronic trading data systems, the innovations described in this disclosure may be readily applied to a wide variety of other fields and/or applications.

What is claimed is:

1. A method of managing the retrieval of medical patient data, comprising:
   obtaining, at a first computer system, a document file comprising medical patient data and embedded content;
   generating, at the first computer system, a print file based on the document file, wherein the print file is configured to be sent via a virtual printer port and comprises the medical patient data isolated from the embedded content;
   sending, via the virtual printer port, the print file to a secure server operatively isolated from the first computer system;
   identifying, at the secured server, the medical patient data in the print file by parsing characters in the print file based on a report template;
   generating, at the secured server, at least one document file using the identified medical patient data;
   encrypting, at the secured server, the at least one document file;
   sending the at least one encrypted document file to a second computer system, wherein the second computer system is configured to provide an authentication interface to permit access to the at least one encrypted document file.

2. The method of claim 1, further comprising authenticating a user via the authentication interface and unencrypting the at least one encrypted document file on based on the authenticated user.

3. The method of claim 2, further comprising providing instructions to access said at least one encrypted document file via the authentication interface.

4. The method of claim 3, wherein the instructions to access the at least one encrypted document file are provided by a second server.

5. The method of claim 3, wherein the instructions to access the at least one encrypted document file are provided by a web-enabled server.

6. The method of claim 3, wherein the instructions to access the at least one encrypted document file are provided by the second computer system.

7. The method of claim 2, wherein authenticating the user comprises seeking an active directory on a second server in order to authenticate the user.

8. The method of claim 2, further comprising generating an encrypted audit trail data file comprising audit trail data indicating the user and a time when the at least one encrypted document file was accessed.

9. The method of claim 8, wherein the audit trail data file is set to an active directory path and is configured to query the active directory path.

* * * * *